(12) United States Patent
Gao et al.

(10) Patent No.: US 11,740,455 B2
(45) Date of Patent: Aug. 29, 2023

(54) PUPIL STEERED DISPLAY

(71) Applicant: Facebook Technologies, LLC, Menlo Park, CA (US)

(72) Inventors: Weichuan Gao, Redmond, WA (US); Ying Geng, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 176 days.

(21) Appl. No.: 17/002,369

(22) Filed: Aug. 25, 2020

(65) Prior Publication Data
US 2022/0066202 A1    Mar. 3, 2022

(51) Int. Cl.
| | |
|---|---|
| *G02B 27/00* | (2006.01) |
| *G02F 1/01* | (2006.01) |
| *G02F 1/29* | (2006.01) |
| *G02B 30/26* | (2020.01) |

(52) U.S. Cl.
CPC ..... *G02B 27/0081* (2013.01); *G02B 27/0093* (2013.01); *G02F 1/0136* (2013.01); *G02F 1/29* (2013.01); *G02B 30/26* (2020.01)

(58) Field of Classification Search
CPC ............ G02B 27/0081; G02B 27/0093; G02B 30/26; G02F 1/0136; G02F 1/29
USPC .......................................................... 359/462
See application file for complete search history.

(56) References Cited

U.S. PATENT DOCUMENTS

| | | |
|---|---|---|
| 2016/0238845 A1 | 8/2016 | Alexander et al. |
| 2017/0185037 A1 | 6/2017 | Lee et al. |
| 2017/0293147 A1 | 10/2017 | Tremblay et al. |
| 2018/0003981 A1 | 1/2018 | Urey |
| 2018/0052325 A1 | 2/2018 | Bohn |
| 2018/0364482 A1 | 12/2018 | Georgiou et al. |
| 2019/0187482 A1 | 6/2019 | Lanman |
| 2019/0361246 A1 | 11/2019 | Lanman et al. |
| 2020/0081252 A1 | 3/2020 | Jamali et al. |
| 2020/0166754 A1 | 5/2020 | Leister et al. |

OTHER PUBLICATIONS

International Search Report and Written Opinion for International Application No. PCT/US2021/044028, dated Nov. 5, 2021, 10 pages.
International Preliminary Report on Patentability for International Application No. PCT/US2021/044028, dated Mar. 9, 2023, 9 pages.

*Primary Examiner* — Collin X Beatty
*Assistant Examiner* — Grant A Gagnon
(74) *Attorney, Agent, or Firm* — Pequignot + Myers; Matthew A. Pequignot

(57) ABSTRACT

A display device may include a plurality of tiled spatial light modulators (SLMs) imparting image information upon respective light beams to obtain image beams. Pupil steering optics are configured to steerably direct the image beams towards a same or different exit pupil locations within an eyebox of the display device, providing exit pupil replication and/or an expanded field of view. An eye tracking system provides location information of the user's eye, enabling the pupil steering optic to direct at least some of the image beams to a desired exit pupil location.

19 Claims, 18 Drawing Sheets

_US 11,740,455 B2_

PUPIL STEERED DISPLAY

TECHNICAL FIELD

The present disclosure relates to visual displays and display systems, and in particular to holographic displays with pupil steering.

BACKGROUND

Head mounted displays (HMDs) are used to provide virtual imagery to a user, or to augment real scenery with additional information or virtual objects. The virtual or augmented imagery can be three-dimensional (3D) to enhance the experience and to match virtual objects to the real 3D scenery observed by the user. In some HMD systems, a head and/or eye position and orientation of the user are tracked, and the displayed scenery is dynamically adjusted depending on the user's head orientation and gaze direction, to provide experience of immersion into a simulated or augmented 3D scenery.

One problem of head-mounted displays, and near-eye displays (NEDs) in particular, is a limited etendue of an optical system. The etendue can be defined as a product of an area of the display's eyebox, or the exit pupil of the display, and the display's field of view (FOV) solid angle. Because of the limited etendue, displays having large fields of view tend to have small eyeboxes, and vice versa. Large fields of view is desirable for a greater degree of immersion into the virtual or augmented reality, while large eyeboxes provide the user with freedom and convenience of placing the display in front of the eyes and eye rotation. Larger eyeboxes provide a greater degree of accommodation of different users having individual size and shape of the head, and different distances between the eyes.

Although the size of the eyebox may depend on magnification of the optical imaging system, the etendue is invariant of the magnification. Because of the etendue invariance, providing larger eyebox may result in a narrower field of view, and widening the field of view may result in a smaller eyebox.

BRIEF DESCRIPTION OF THE DRAWINGS

Embodiments disclosed herein will be described in greater detail with reference to the accompanying drawings, which are not to scale, in which like elements are indicated with like reference numerals, and wherein.

DETAILED DESCRIPTION

Figure 1:
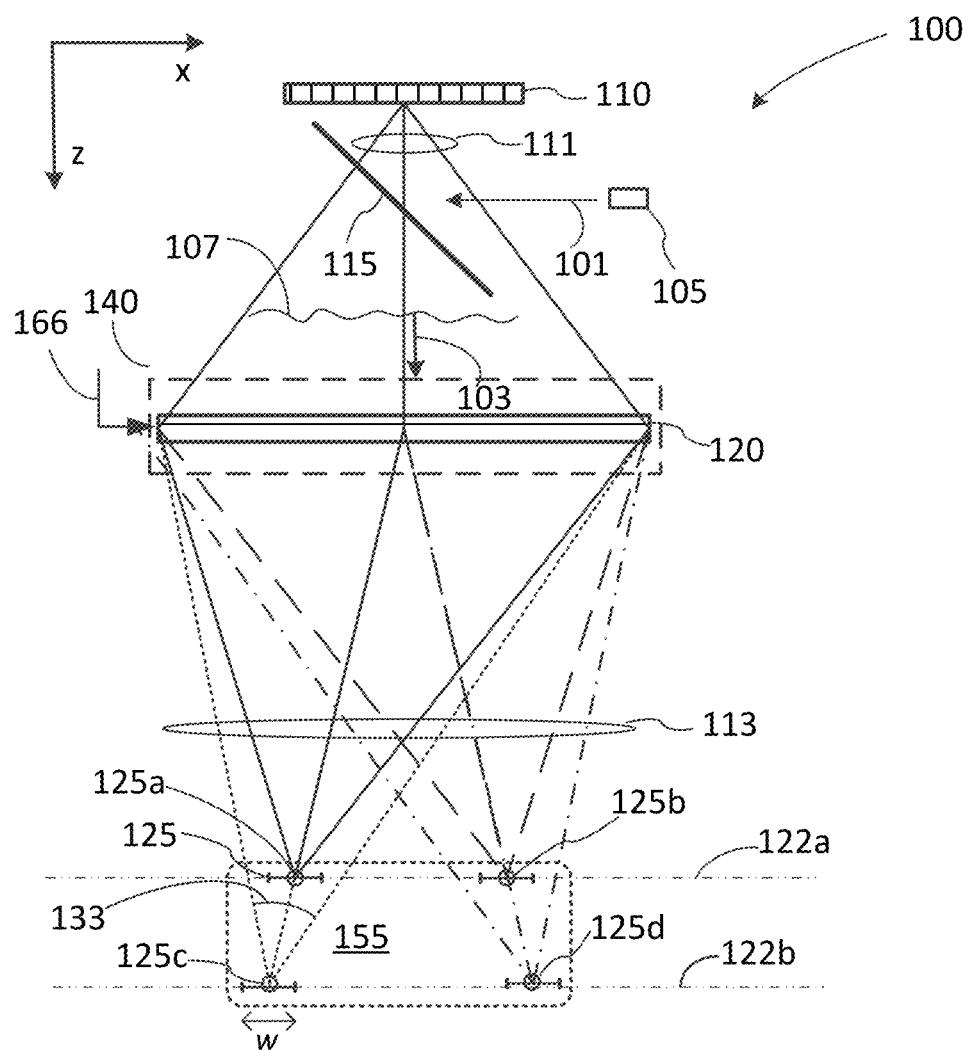
FIG. 1 is a schematic plan view of a holographic projector with a spatial light modulator (SLM) and pupil steering optic.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the example embodiments. Elements and features described with reference to one example embodiment may also be used in other embodiments. Reference throughout this specification to "one embodiment" or "an embodiment" means that a particular feature, structures, or characteristics may be combined in any suitable manner in one or more embodiments. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Block diagrams included with this specification can represent conceptual views of illustrative circuitry embodying principles of the technology. The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Note that as used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. As used in this specification and the appended claims, the singular forms "a," "an," and "the" include plural referents unless the content clearly dictates otherwise. It should also be noted that the term "or" is generally employed in its broadest sense to include "and" unless the content clearly dictates otherwise.

The term "exit pupil" refers to an area to which a display projector converges an image beam or beams. In order for the user to see displayed content, the exit pupil may need to align with, be encompassed by, or overlap with the ocular pupil of the user's eye. In some embodiments the exit pupil may be configured to fit within the ocular pupil of the user to provide the full resolution and/or the full field of view (FOV) of the display. The term eyebox refers to a range of eye positions (relative to a near-eye optical device) over which specific content/imagery provided by the device is visible to the user. The eyebox may be thought of as a volume in space positioned near the optical device. When the eye of the user is positioned inside this volume and facing the device, the user may be able to see all of the content/imagery provided by the device. When the eye of the user is positioned outside of this volume, the user may not able to see at least some of the content/imagery provided by the device with a desired image quality.

The term "replication", e.g. in the context of "exit pupil replication", is used to refer to producing multiple instances of substantially the same thing, such as an exit pupil. The term "exit pupil replication" is intended to generally encompass approaches that produce concurrent (e.g., temporally parallel) instances of an exit pupil as well as approaches that produce sequential (e.g., temporally serial or "repeated") instances of an exit pupil.

Furthermore, the following abbreviations and acronyms may be used in the present document:
HMD Head Mounted Display
NED Near Eye Display
PSHP Pupil Steering Holographic Projector
LC Liquid Crystal
PBP Pancharatnam-Berry Phase
LED Light Emitting Diode
LD Laser Diode
CP Circular Polarized
LCP Left-handed Circular Polarized
RCP Right-handed Circular Polarized
HWP Half-Wave Plate, i.e. a waveplate with a modulo $2\pi$ retardance of an odd number of $\pi$ radian
QWP Quarter-Wave Plate, i.e. a waveplate with a modulo $2\pi$ retardance of $\pi/2$ radian
SLM Spatial Light Modulator
WFM Wave-Front Modulator
PSO Pupil Steering Optic
FOV Field of View Example embodiments described in the present disclosure relate to display systems with pupil steering. One or more of the embodiments relate to holographic display devices or systems using spatial light modulators (SLMs) configured to encode 2D or 3D images onto a wavefront of an incident light beam, and a beam steering optic for steering the image-encoded wavefront to converge to a desired exit pupil from a plurality of supported exit pupils, or to steer the exit pupil to a desired location from a discreet or continuous plurality of supported exit pupil locations. One or more of the embodiments relate to display devices or systems with two or more tiled SLMs followed by one or more wavefront modulators (WFMs) to provide at least one of an enhanced FOV at a selected exit pupil location or to replicate the steerable exit pupil within an extended eyebox.

One or more embodiments may relate to a display device comprising: a first spatial light modulator (SLM) configured to impart first image information upon a first light beam to provide a first image beam; a second SLM configured to impart second image information upon a second light beam to provide a second image beam; and a pupil steering optic (PSO).

In some implementations the PSO may be operable in a plurality of states comprising a first state and a second state, wherein in the first state the PSO directs the first and second image beams toward one or more first exit pupils of the display device, and in the second state the PSO directs the first and second image beams toward one or more second exit pupils of the display device.

In some implementations the PSO may be operable to direct the first and second image beams toward at least one first exit pupil location responsive to one or more first control signals, and to direct the first and second image beams toward at least one second exit pupil location responsive to one or more second control signals.

In some implementations the PSO may be configured so that the first and second image beams may converge at a same exit pupil, or at least partially overlapping exit pupils, at differing angles of incidence.

In some implementations the display device may further comprise an eye tracking module configured to provide eye position information, and a controller operatively coupled to the eye tracking module and configured to provide the one or more first control signals or the one or more second control signals to the at least one PSO in dependence on the eye position information.

In some implementations at least one of the first SLM or the second SLM may be configured to operate in reflection.

In some implementations the at least one PSO comprises a first wavefront modulator (WFM) configured to operate in transmission. In some implementations the first WFM comprises at least one polarization-controllable device. In some implementations the at least one polarization-controllable device comprises a polarization switch and one of a polarization grating or a polarization-sensitive lens.

In some implementations the first WFM is disposed in optical paths of the first and second image beams. In some implementations the first WFM is configured to focus the first and second image beams at different exit pupil locations.

In some implementations the first WFM is disposed in an optical path of the first image beam, and a second WFM is disposed in an optical path of the second image beam. In some implementations the first WFM and the second WFM may be configured to focus the first image beam and the second image beam to a same exit pupil location. In some implementations the first WFM and the second WFM may be configured to focus the first image beam and the second image beam to a same exit pupil location in different solid angles. In some implementations the first WFM and the second WFM are configured to focus the first image beam and the second image beam to the same exit pupil location in distinct solid angles. In some implementations the first WFM and the second WFM are configured to focus the first image beam and the second image beam to the same exit pupil location in complementary solid angles to support an enhanced field of view that exceeds a field of view supported by either the first WFM or the second WFM In some implementations the display device may further comprise a folded optic disposed in an optical path of at least one of the first and second image beams. In some implementations the folded optic may be disposed in the optical path between at least one of the first and second SLM and the at least one PSO. In some implementations the folded optic may be disposed downstream of the at least one PSO. In some implementations the folded optic may comprise at least one of a pancake lens or a birdbath optic.

An aspect of the present disclosure provides a method for displaying an image to a user, the method comprising: obtaining eye position information for an eye of the user; encoding image information onto a plurality of spatial light modulators (SLM); illuminating the plurality of SLMs with at least partially coherent light beams to obtain a plurality of image beams; passing the plurality of image beams through a pupil steering optic configured to operate in a plurality of states supporting a plurality of exit pupils, wherein in at least one of the states at least two of the image beams are received at one or more exit pupils in distinct solid angles; and controlling the pupil steering optic to steer the plurality of image beams toward at least one of the exit pupils responsive to the eye position information.

An aspect of the present disclosure provides a holographic projector comprising: first and second spatial light modulators configured to impart first and second image information upon first and second light beams, respectively, to obtain image light carrying an image in angular domain; and a pupil steering optic operably coupled to the first and second spatial light modulators for conveying the image light to an exit pupil of the holographic projector, wherein the first and second image information correspond to first and second portions, respectively, of the image in angular domain at the exit pupil thereof. In some implementation of the holographic projector, the pupil steering optic may comprise a tunable element for adjusting a position of the exit pupil in 3D space. In some implementation, the pupil steering optic may comprise first and second pupil steering assemblies for conveying the first and second portions, respectively, of the image in angular domain to the exit pupil.

FIG. 1 schematically illustrates an example holographic projector 100 with pupil steering, which may also be referred to herein as the pupil-steering holographic projector (PSHP) 100. As illustrated, PSHP 100 includes a spatial light modulator (SLM) 110 optically followed by a pupil steering optic (PSO) 140. SLM 110 is configured to convert an illumination light beam 101 into an image beam 103 by encoding image information into its wavefront 107. PSO 140 is operable to steer, and optionally focus, the image beam 103 responsive to a control input 166. PSO 140 may include a wavefront modulator (WFM) 120 configured to spatially modulate the wavefront 130 of the image beam 103, e.g. for focusing and/or redirecting the image beam. PSO 140 and variants thereof, such as those described herein by way of example, may also be referred to as a pupil steering optical module. In some embodiments PSO 140 may further include one or more other optical components/assemblies/modules, including but not limited to beam splitters, lenses, curved mirrors, flat mirrors, waveplates, apertures, optical waveguides, and the like, which in some embodiments may be arranged to fold the optical path (folded optic). In some embodiments additional optical components and modules may be provided optically upstream or downstream of WFM 120. In some embodiments additional optical components and modules may be provided in association with the SLM 110. Additional optical components used in PSHP 100 may include, but not limited to, folded optics or elements thereof, positive and/or negative lenses, including but not limited to Fresnel lenses and liquid crystal (LC) lenses, other LC elements, diffraction gratings, flat and/or curved mirrors, waveplates, polarization converters, beam splitters including polarization beam splitters, and the like.

A light source 105 may further be provided to illuminate SLM 110. The light source 105 may be a source of at least partially coherent light, i.e. light that is coherent across a substantial area of SLM 110 in at least one direction. In some embodiments the light source 105 may be a point source. In some embodiments the light source 105 may include one or more lasers. In some embodiments the light source 105 may include one or more laser diodes (LD) or light-emitting diodes (LED), which may be operable to emit substantially the same wavelength or color or different wavelengths or colors, such as to support two or more color channels. In some embodiments the light source 105 may include one or more optical elements, such as lenses and/or flat or curved mirrors, which may have positive or negative focusing power. In some embodiments the light source 105 may include focusing or collimating optic. In some embodiments, light emitted by the light source 105 may be coupled into an optical waveguide, e.g. an optical fiber, which may be routed to illuminate SLM 110.

FIG. 1 schematically illustrates light propagation for an example architecture supporting at least four different locations 125a-125d of an exit pupil 125 of PSHP 100, disposed in two exit pupil planes 122a and 122b. The plurality of supported locations 125a-125d may also be referred to as the supported exit pupil locations 125a-125d, or exit pupil positions 125a-125d. In some embodiments PSO 140 may be configured so that the exit pupil planes 122a and 122b are conjugate planes of SLM 110 for different states of WFM 120 or different control inputs 166, so that pixels of SLM 110 are imaged onto a desired exit pupil position; this is schematically illustrated by rays 111, 113 for one pixel of SLM 110, with other SLM pixels imaged onto other locations within the exit pupil 125. Note that in some embodiments PSO 140 may be configured so that the exit pupil planes 122a and 122b are conjugate, for respective states of WFM 120 or respective control inputs thereto, to a plane that does not coincide with SLM 110. In some embodiments either the exit pupil plane 122a or the exit pupil plane 112b may be optically conjugate to the light source 105, depending on a state of PSO 140 and/or WFM 120. In some embodiments SLM 110 may be illuminated by a divergent light beam from the light source 105. In some embodiments SLM 110 may be illuminated by a converging light beam or a collimated light beam.

SLM 110 may be a pixelated diffractive optical device capable of spatially modulating at least one of the phase, amplitude, or polarization of incident spatially-coherent light in a dynamically reconfigurable manner. SLM 110 may be dynamically programmable, typically but not exclusively by electrical signals, to spatially encode a phase and/or amplitude pattern comprising information about an image or a scene, which may then be reproducible as a real or virtual image by illuminating SLM 110 with spatially coherent light 101. In some embodiments, SLM 110 may be encoded with a modulation pattern representing a computer-generated hologram (CGH) to provide a 2D or 3D image.

In some embodiments, the modulation pattern may be defining a spatial modulation of at least the phase of output light, thereby modulating the wavefront 107 of a light beam 103 downstream of SLM 110, which may be referred to as the image beam 103. In some embodiment the CGH may be encoding a superposition of an image pattern representing a scene, and a spherical-wave, elliptical-wave, or cylindrical-wave phase to encode a focusing power into the SLM, so that the light beam 103 changes its convergence properties after being reflected from or transmitted by SLM 110. In some embodiments a linear phase change may be encoded to change the angle of propagation of the image light after the SLM. In some embodiments these superimposed phase functions may be configured to compensate for optical aberrations in the display system and/or imperfections of the user's eye, such as near-sightedness, far-sightedness, astigmatism, and the like. In some embodiments these superimposed phase functions may be dynamically adjusted in dependence on the eye position information, the direction of gaze, or the current content of the image, and possibly other factors.

In the illustrated embodiment, SLM 110 operates in reflection; in other embodiments, it may operate in transmission. Various SLM technologies may be used to implement SLM 110 and other SLMs described below, including but not limited to those based on liquid crystal (LC) arrays. In some embodiments, SLM 110 may be a reflective device based on an LC on silicon (LCOS) technology and may include a 2D LCOS pixel array. Some embodiments may use other SLM technologies, such as for example micro-electromechanical systems (MEMS) SLMs including arrays of tiltable mirrors, SLMs utilizing acousto-optical or magneto-optical effects, and the like.

FIG. 1 illustrates an embodiment in which a light beam 101 from the light source 105 illuminates SLM 110 by means of a coupling element 115, and SLM 110 is a reflective device that converts the illumination beam 101 into the image beam 103. The coupling element 115 may be embodied for example with an at least partially reflective element. In an example arrangement the light source 105 may emit linearly polarized light, and the coupling element 115 is a polarization beam splitter (PBS) oriented to reflect this light toward SLM 110. Light reflected from SLM 110 may be converted to an orthogonal polarization, for example using a double-passed QWP, and then transmitted through the PBS toward PSO 140 and WFM 120.

WFM 120 may be a device, module, or optical assembly capable of modulating the wavefront of the image light 103 incident thereon so as to steer it in a desired direction, thereby adjusting a position of an exit pupil of the projector and/or steering the FOV of the projector. In one or more embodiments WFM 120 may also be dynamically reconfigurable to adjust the focus distance of the projector, which may include the ability to focus the image light beam at any one of a plurality of different spatial locations.

In some embodiments, WFM 120 may be configured to steer the exit pupil in space in two dimesons (2D), so that the plurality of supported exit pupils are positioned in a same exit pupil plane, which may be slightly curved. In some embodiments, WFM 120 may be a tunable or switchable deflector with a zero focusing power. In some embodiments WFM 120 may have a non-zero focusing power. In some embodiments WFM 120 may be configured to steer the exit pupil in space in three dimesons (3D), so that the plurality of supported exit pupils are positioned in two or more exit pupil planes at different distances from the WFM 120. In some embodiments WFM 120 may include one or more varifocal lens elements. In some embodiments, the focusing power of PSO 140 may be determined by that of WFM 120. In some embodiments the focusing power of PSO 140 may be determined by a combination of the focusing power of PSO 140 and the focusing power of other optical elements that may be present in PSO 140, such as for example lenses and/or curved mirrors.

In some implementations WFM 120 may be embodied with a dynamically reconfigurable SLM, and may use any technology suitable to perform the steering and, possibly, focusing functions described herein with reference to example embodiments. In some embodiments WFM 120 may also be configured to perform some wavefront-cleanup functions, such as for example correcting for optical aberrations. In at least some embodiments WFM 120 is an electro-optical device that operates in transmission substantially without mechanical movements of its constituent parts. In some embodiments WFM 120 may utilize LC technology. In such embodiments, WFM 120 may be electrically switchable between $N>1$ different states corresponding to N different spatial locations of the exit pupil 125 of PSHP 100. In the illustrated example WFM 120 is switchable in focusing power, and is capable of switching the exit pupil 125 of the display system between two different exit pupil planes 122a and 122b, thereby adjusting the position of the exit pupil 125 in 3D space. In some embodiments WFM 120 may be capable of continuous 1D pupil steering, 2D pupil steering, or 3D pupil steering. Accordingly, the term "states" with reference to a WFM may be used to encompass both discrete states and continuously tunable states. In some embodiments WFM 120 may include a stack of polarization-controllable elements interspersed with polarization switches. Example embodiments of such stacks may include volume holographic polarization gratings and active and/or passive Pancharatnam-Berry Phase (PBP) elements, such as PBP gratings and/or PBP lenses, and switchable half-wave plates (HWP).

FIG. 1 illustrates, by way of example, N=4 different exit pupil positions 125a-125d, to which PSO 140 may direct, and at least in some embodiments converge, the image light it receives from SLM 110. In other embodiment the number N of the supported exit pupil locations may be different, for example greater than four. Although the exit pupil positions 125a-125d are shown in FIG. 1 to be sparsely located within an eyebox 155 for clarity, in various embodiments they may be located sufficiently close to each other so that the ocular pupil of a human eye positioned anywhere within the eyebox 155 overlaps with at least one of the exit pupil positions 125a-d.

The size and shape of the exit pupil 125 may be defined generally by the size and shape of the SLM 110 and the combined focusing power and positions of various optical components of the display system, including the focusing power that may be encoded to SLM 110 and WFM 120, and focusing power of other optical components that may be present in the PSO 140. In some embodiments the size of the exit pupil 125 may vary somewhat depending on the exit pupil's position. In some embodiments the exit pupil 125 may be smaller in size than an ocular pupil of a human eye at a relevant illumination level, so as to fit within the ocular pupil. By way of example, the ocular pupil of a human eye in bright light may be about 2 to 4 mm in diameter, and the size w of the exit pupil 125 may be about or less than 2 mm along the greatest dimension thereof, for example about 1 mm to 2 mm, or in some embodiments from as small as 0.5 mm to 4 mm. Here the greatest dimension may refer to a longer side of a rectangular exit pupil, the diameter of a circular exit pupil, or the longer axis of an elliptic exit pupil. In some embodiments the exit pupil 125 may be somewhat greater in size than the typical ocular pupil of a human eye, which may allow PSO 140 to support fewer exit pupil positions within the eyebox, but may lead to some loss in resolution.

Exit pupil 125 may receive image light in a solid angle 133, indicated in FIG. 1 for the exit pupil positon 125c by way of example. This solid angle 133 may be referred to as a field of view (FOV) 133 of PSHP 100. WFM 120 is operable to steer the FOV 133 toward any of the exit pupil positions 125a-125d, for example in dependence of the position of the user's eye within the eyebox 155. The size of FOV 133 is a function of the exit pupil's size and the étendue of PSHP 100, and may be relatively small for at least some PSPH implementations. A factor limiting the étendue may be the pixel count of the SLM 110. By way of example, an LCOS-SLM having 4000×4000 pixels may support a FOV of 48×48 degrees with a resolution of 1 arc minute. Advantageously, the FOV of a PSHP may be effectively increased with SLM tiling substantially without a loss in display efficiency.

Figure 2:
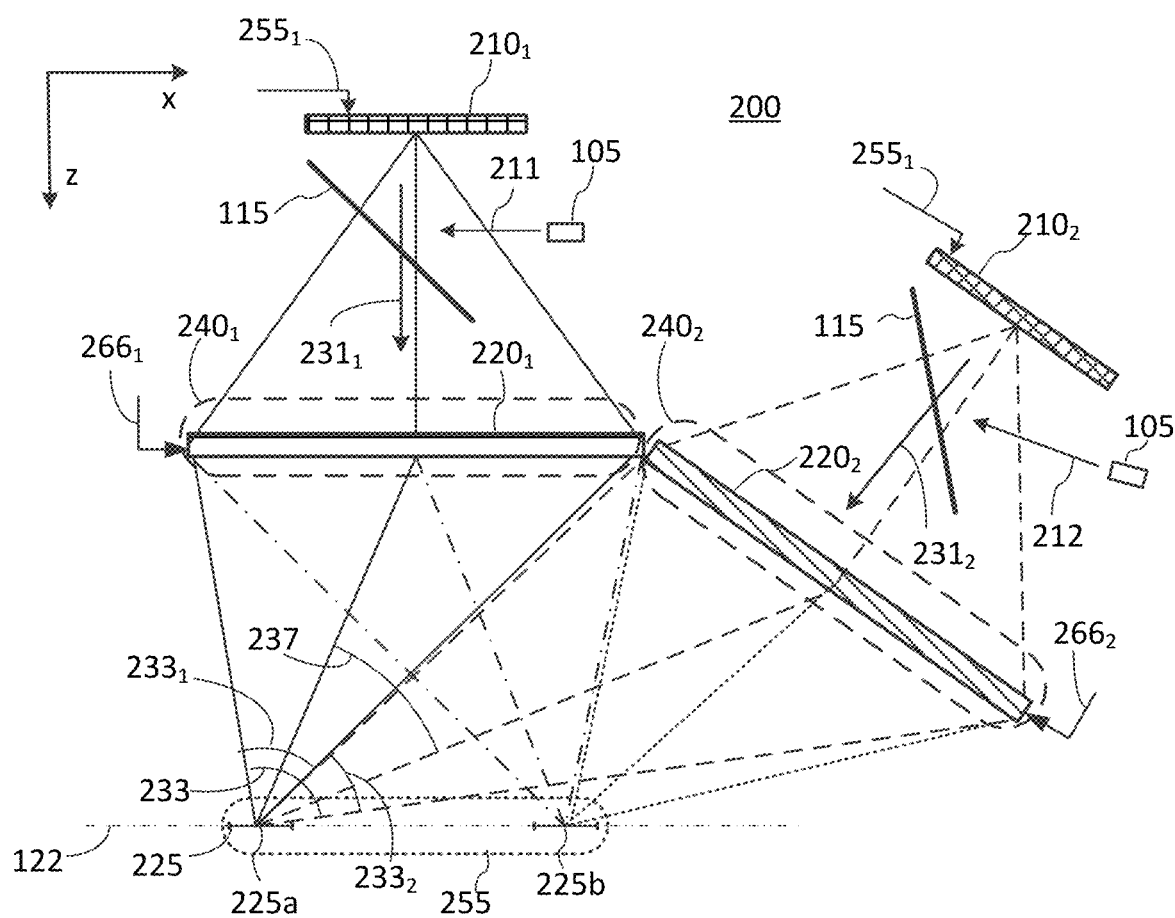
FIG. 2 is a schematic plan view of an example pupil steering holographic projector with tiled SLMs providing tiled FOV.

FIG. 2 illustrates an example PSHP 200 with tiled SLMs configured for providing an enhanced FOV. In the illustrated example, PSHP 200 includes two tiled SLMs, a first SLM $210_1$ optically coupled to a first PSO $240_1$, and a second SLM $210_2$ optically coupled to a second PSO $240_2$. The first SLM $210_1$ and the second SLM $210_2$ may be collectively referred to as SLM tiles 210 or simply as SLMs 210. Although two SLMs 210 are shown, more may be present. The first PSO $240_1$ and the second PSO $240_2$ may be collectively referred to as the pupil steering optics (PSOs) 240. The first PSO $240_1$ includes a first WFM $220_1$, and may also include other optical elements and devices, such as but not exclusively focusing and/or folded optics. The second PSO $240_2$ includes a second WFM $220_2$, and may also include other optical elements such as but not exclusively focusing and/or folded optic. Each of the two PSOs $240_1$, $240_2$ and the associated WFMs $220_1$, $220_2$ may be as described above with reference to PSO 140 and WFM 120, respectively. In the illustrated embodiment PSHP 200 may be viewed as two PSPH 100 disposed next to each other in a (x,z) plane and configured to have a plurality of common exit pupil positions.

In operation SLM $210_1$ and SLMs $210_2$ are illuminated with light beams 211, 212 from light sources 105, which may be as described above. In some embodiments, different SLM tiles may be illuminated by light from different light sources 105. In some embodiments, two or more SLM tiles may be illuminated by light from a same light source 105 using one or more beam splitters. In some embodiments, optical fibers can be used to rout light to different SLM tiles 210 from a shared light source 105.

The first and second SLMs $210_1$, $210_2$ may be dynamically configured to impart first and second image information $251_1$, $251_2$ upon the first and second light beams 211, 212, respectively, to obtain first and second image beams $231_1$ and $231_2$, respectively, which are schematically represented by arrows. The first and second image beams $231_1$ and $231_2$ may be referred to collectively as image beams 231 or image light 231. PSOs 240 are operable to support a shared exit pupil 225 steerable to a plurality of exit pupil locations, such as locations 225a and 225b. In some embodiments the first PSOs $240_1$ and the second PSO $240_2$ may be tunable to steer the image beams 231 between a common set of exit pupil locations. In some embodiments the first PSOs $240_1$ and the second PSO $240_2$ may be tunable to steer the image beams to any location within an eyebox 255, providing a continuous plurality of supported exit pupil locations.

In some embodiments the first PSOs $240_1$ and the second PSO $240_2$ may be switchable between a common set of N locations of the exit pupil 225, which may correspond to N discrete states of PSOs 240. In FIG. 2, the common set of N exit pupil locations is represented by positions 225a and 225b in an exit pupil plane 222. In one embodiment PSOs $240_1$, $230_2$ are operable to direct the first and second image beams $231_1$, $231_2$, respectively, toward either the first exit pupil location 225a or the second exit pupil location 225b responsive to respective control inputs $266_1$, $266_2$ to WFMs 220. In an example scenario PSOs 240 direct the first and second image beams $231_1$, $231_2$ toward the first exit pupil location 225a when control inputs $266_1$, $266_2$ include first control signals $S_{11}$ and $S_{21}$, respectively, and direct the first and second image beams $231_1$, $231_2$ toward the second exit pupil location 225b when control inputs $266_1$, $266_2$ include second control signals $S_{12}$ and $S_{22}$, respectively. In some embodiment PSOs $240_1$, $240_2$ may steerably relay the SLMs $210_1$, $210_2$ to a same exit pupil location, e.g. 225a or 225b, with the image beams $231_1$, $232_2$ generating exit pupils of approximately equal size at the exit pupil plane 122. In some embodiments the exit pupils generated by the image beams $231_1$, $232_2$ overlap but differ in size at one or more of the exit pupil locations. For example, the exit pupil generated by the first image beam $231_1$ may be larger at the exit pupil plane 122, while the exit pupil generated by the second image beam $232_2$ may be focused to a generally same location at the exit pupil plane 122 but with a comparatively smaller size, overlapping there with the exit pupil generated by the first image beam $231_1$. In such embodiments the image beam with the comparatively large exit pupil may support central vision of a user with a comparatively greater angular resolution, while the image beam with the comparatively smaller exit pupil may support peripheral vision of the user with a comparatively lower angular resolution. In some embodiments PSOs 240 may also be operable to convey image beams $231_1$ and $231_2$ to different exit pupils.

The first and second PSOs $240_1$, $240_2$ may be configured so that when both WFM $220_1$, $220_2$ are in a state corresponding to a same location 225a or 225b of the shared exit pupil 225, the image beams $231_1$ and $231_2$ from SLMs $210_1$ and $210_2$, respectively, are incident at the exit pupil plane 222 at different angles of incidence, with distinct FOVs $233_1$ and $233_2$ having non-overlapping portions. The FOVs $233_1$ and $233_2$ may be understood as solid angles subtended by PSOs $240_1$ and $240_2$, respectively, as seen from a location within an exit pupil 225; they may be denoted as FOV1 and FOV2, respectively, and may vary somewhat depending on the exit pupil location. In some embodiments the first and second PSOs $240_{1,2}$ may be configured so that the incidence angles of central rays of the image beams $231_1$ and $231_2$ upon an exit pupil may differ by an angle 237 of at least 20 degrees.

The image light 231 may carry an image in part in angular domain. A first portion of the image in angular domain, which may correspond to the first image information $251_1$, may be delivered to the exit pupil by the first image beam $231_1$ within the first FOV $233_1$. A second portion of the image in angular domain, which may correspond to the second image information $251_2$, may be delivered to the exit pupil with by the second image beam $231_2$ within the second FOV $233_2$. Thus FOVs $233_1$ and $233_2$ may carry different portions of an image or scene. The extended FOV 233 of PSHP 200, which may be denoted $FOV_{12}$, is composed of the first and second FOVs $233_1$ and $233_2$, $FOV_{12}$=[$FOV_1$ U $FOV_2$].

PSOs 240 may be configured so that the extended FOV 233 is continuous and is substantially broader than the first FOVs $233_1$ or the second FOVs $233_2$ in at least one angular dimension. Here "substantially broader" means at least 20% broader. By way of example, the (x,z) plane of FIG. 2, in which SLM/PSO pairs $210_1/240_1$ and $210_2/240_2$ are disposed next to each other, may correspond to a "horizontal" plane of a NED comprising PSHP 200, and the angular width of FOV12 is at least 20% greater than the angular width of at least one of FOV1 or FOV2 in the horizontal dimension. In other examples, the (x,z) plane of FIG. 2 may correspond to a "vertical" or "diagonal" plane of the NED, and FOV12 is at least 20% broader than at least one of FOV1 or FOV2 in the vertical or the diagonal angular dimension, respectively. For example, if FOV1 is 50 degrees in the plane of tiling, FOV12 in that plane may be at least 60 degrees or broader. In some embodiments, FOV12 may be at least 50% broader than one of FOV1 or FOV2.

In a holographic projector with M>1 SML tiles, up to M image beams, carrying up to M portions of an image in angular domain, may be steered to a desired exit pupil, and the holographic projector may be configured so as to provide a continuous extended FOV that is at least 20% broader, or at least 50% broader than a FOV supported by any individual SLM tile.

In some embodiments the first FOV $233_1$ and the second FOV $233_2$ may be substantially complementary in one angular dimension, so that the extended FOV 233 is substantially a sum of the first and second FOVs. Here the term "substantially" may mean that the angular width of an overlap portion of the FOVs $233_1$ and $233_2$ is less than a quarter of an angular width of either one of the FOVs' $233_1$ and $233_2$. By way of example, for a display device with an eyebox of 15 mm×15 mm×10 mm along the X, Y, and Z axes, the overlap portion may be less than 5%, or less than 10% of the angular width of either FOV1 or FOV2 in in any plane dissecting the overlap portion of the FOVs, for example in any one of a vertical, horizontal, or diagonal dimension of the FOV1 or FOV2.

In some embodiments, artifacts caused by interference at FOV edges between image beams from different SLMs may be mitigated by temporal separation of displaying the tiled images. For example, when displaying a scene, the first SLM $210_1$ may be programmed with a first CGH corresponding to a left half of the scene, while the second SLM $210_2$ may be programmed with a second CGH corresponding to a right half of the scene, with a small temporal shift so that each half of the scene is displayed in a different time slot, with the eye effectively integrating the corresponding images in a single image. In some embodiments, image beams from the two SLMs may be separated spectrally.

Figure 3A:
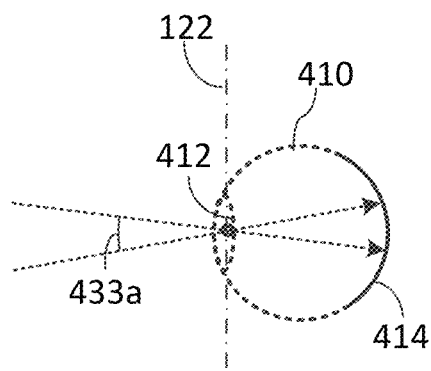
FIG. 3A is a schematic diagram illustrating an eye of a user of the holographic projector of FIG. 1 receiving an image beam in a first gaze direction.
Figure 3B:
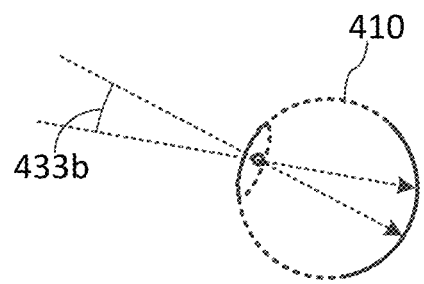
FIG. 3B is a schematic diagram illustrating the eye of the user of the holographic projector of FIG. 1A or 1B receiving an image beam in a second gaze direction.

FIGS. 3A, 3B illustrate an eye 410 of a user with an ocular pupil 412 receiving image light in a FOV 433a when the eye is in a first position, and receiving image light in a FOV 433b when the eye is in a second position. The first position may correspond, for example, to the ocular pupil 412 being at the exit pupil location 125a of PSHP 100 in FIG. 1 with FOV 433a corresponding to FOV 133. The second position may correspond, for example, to the ocular pupil 412 being at the exit pupil location 125b in FIG. 1. When the eye of the user of PSHP 100 is in the first position, WFM 120 may be in a state to direct the image beam to the first exit pupil location 125a. When the eye 410 of the user of PSHP 100 moves to the second position, WFM 120 may be switched to direct the image beam to the second exit pupil location 125b.

Figure 4A:
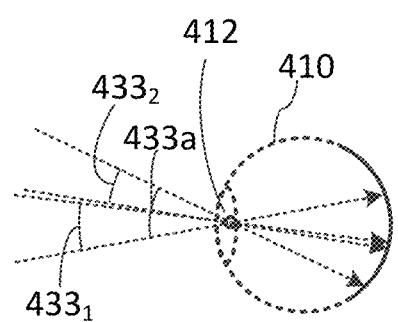
FIG. 4A is a schematic diagram illustrating the eye of the user of the holographic projector of FIG. 2 with an expanded FOV receiving two image beams from two SLM tiles in a first gaze direction.
Figure 4B:
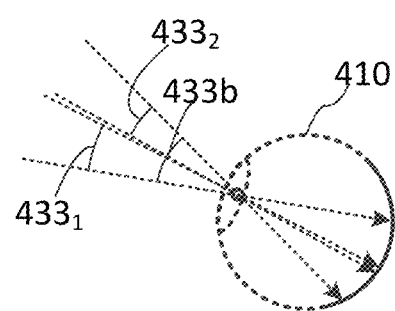
FIG. 4B is a schematic diagram illustrating the eye of the user of the holographic projector of FIG. 2 with an expanded FOV receiving two image beams from two SLM tiles in a second gaze direction.

FIG. 4A illustrates eye 410 receiving image light in a tiled FOV 433a when the eye is in a first position, which may correspond to a first gaze direction. FIG. 4B illustrates eye 410 receiving image light in a tiled FOV 433b when the eye is in a second position, which may correspond to a second gaze direction. The first position may correspond, for example, to a position of an eye of a user of PSHP 200 of FIG. 2 when the ocular pupil 412 of the user's eye is at the exit pupil location 225a of PSHP 200, with FOV 433a corresponding to the combined or tiled FOV 233. The second position may correspond to, for example, the eye position of the user of PSHP 200 wherein the ocular pupil 412 is at the second exit pupil location 525b of PSHP 200. When the eye of the user of PSHP 200 is in the first position, each of WFMs $220_{1,2}$ may be in a state to direct the respective image beam to the first exit pupil location 225a. When the eye changes its position to the second position, for example due to a change in the gaze direction, WFMs $220_1$ and $220_2$ may be switched to direct the respective image beams to the second exit pupil location 125b. In both positions, the effective FOV 433 available to the user is increased compared to PSHP 100 without SLM tiling.

FIGS. 3A-4B illustrate a Maxwellian view display configuration where the image beams converge at an exit pupil to a small size that may be smaller than the ocular pupil 412, and the image is projected to retina 414. Advantages of this approach include a greater depth of view that relaxes the vergence-accommodation conflict (VAC) known to affect near-eye displays. However embodiments described herein are not limited to Maxwellian view displays, and may include displays with the size of the exit pupil that may be equal or greater than a typical size of an ocular pupil of a user's eye.

Figure 5:
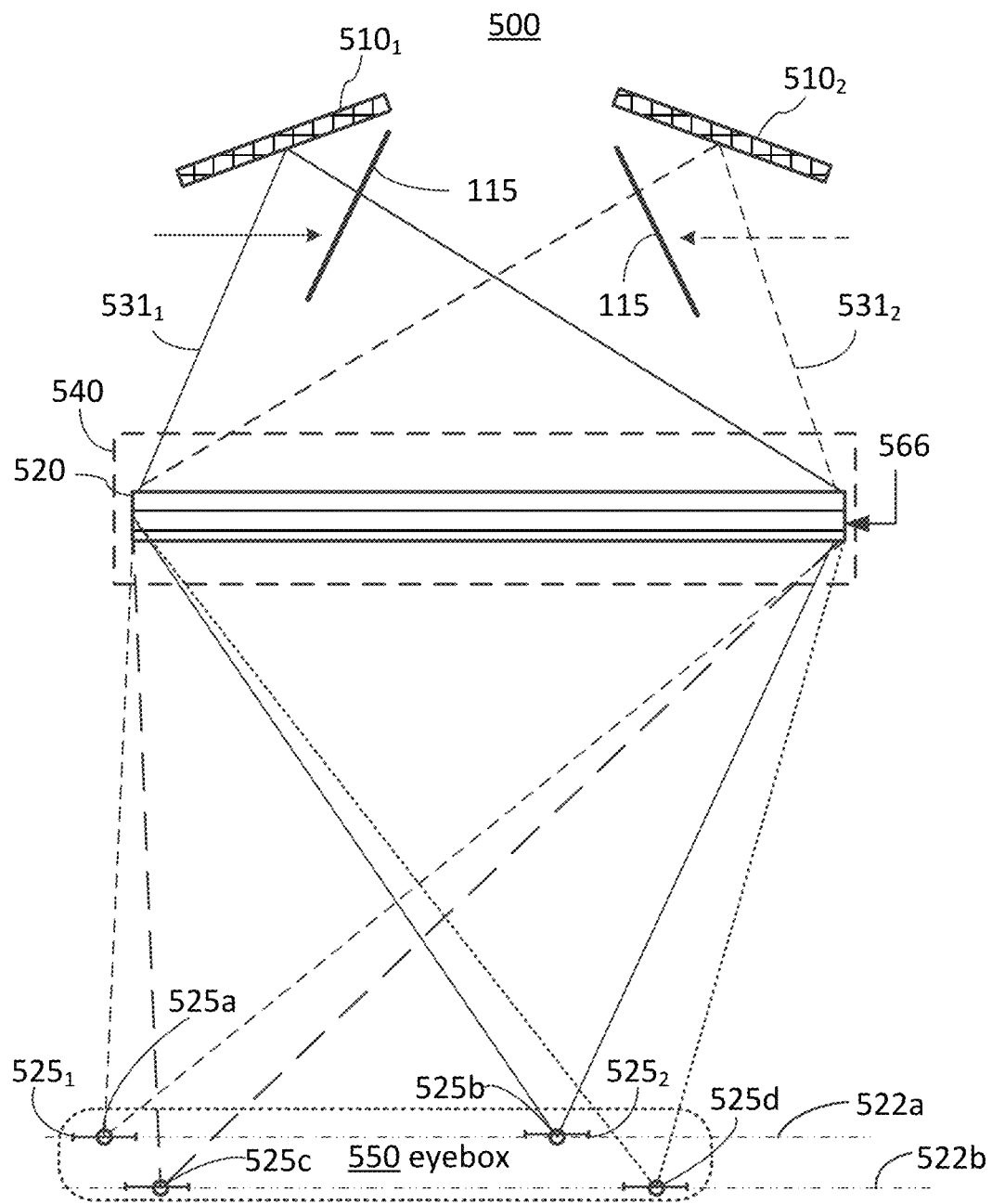
FIG. 5 is a schematic plan view of a holographic projector with tiled SLMs sharing a pupil steering optic.

FIG. 5 illustrates an example PSHP 500 with SLM multiplexing. In the illustrated embodiment, two SLMs $510_1$ and $510_2$ share PSO 540 and a WFM 520. SLMs $510_1$, $510_2$ may also be generally referred to as SLM tiles 510 or simply as SLMs 510. In the illustrated example, the output image beams of the SLM tiles 510 fully overlap at the WFM 520, although in other embodiments they may overlap only partially or not overlap at all. The PSO 540 and WFM 520 may be generally as described above with reference to PSO 140, 240 and WFM 120, 220. WFM 520 may be switchable or tunable between different states responsive to control inputs 566, each state supporting an associated subset of one or more exit pupil locations, thereby providing pupil replication. In this embodiment, in each state of WFM 520 image beams $531_1$, $531_2$ from different SLM tiles $510_1$, $510_2$ are directed to different exit pupil locations of a subset. In FIG. 5 these subsets of the exit pupil locations are represented by first exit pupil locations 525a and 525b in an exit pupil plane 522a, and by second exit pupil locations 525c and 525d in an exit pupil plane 522b. In an example scenario PSO 540 may direct the first and second image beams $231_1$, $231_2$ toward the first exit pupil locations 525a and 525b, respectively, when control input 566 includes a first control signal $S_1$ to bring PSO to a first state, and may direct the first and second image beams $231_1$, $231_2$ toward the second exit pupil locations 525c and 525d, respectively, when control input 566 includes a second control signal $S_1$ to bring PSO 540 to a second state. Image beams $531_1$, $531_2$ may carry a same image or same portions of an image. In this embodiment, the SLM multiplexing may provide exit pupil steering and exit pupil replication, as represented by exit pupil replicas $525_1$ and $525_2$, for each state of the PSO or each state of the WFM, thereby supporting an extended eyebox 550. Exit pupil locations 525a-525d may be located densely enough within the extended eyebox 550, such that one of them appears at least partially within an ocular pupil of a user's eye for any position thereof within the eyebox 550.

Holographic projectors such as PSHP 100, 200, 500 and variants thereof may be used in a variety of display devices, including but not limited to near-eye displays configured for VR and/or AR applications, heads-up displays, and heads-down displays. When used in a display device adapted for VR applications, where non-transparent devices such as reflective SLMs may be disposed in the line of view of a user without requiring beam combiners to transmit light from the outside, approaches described above may enable comparatively simple optical designs.

Figure 6A:
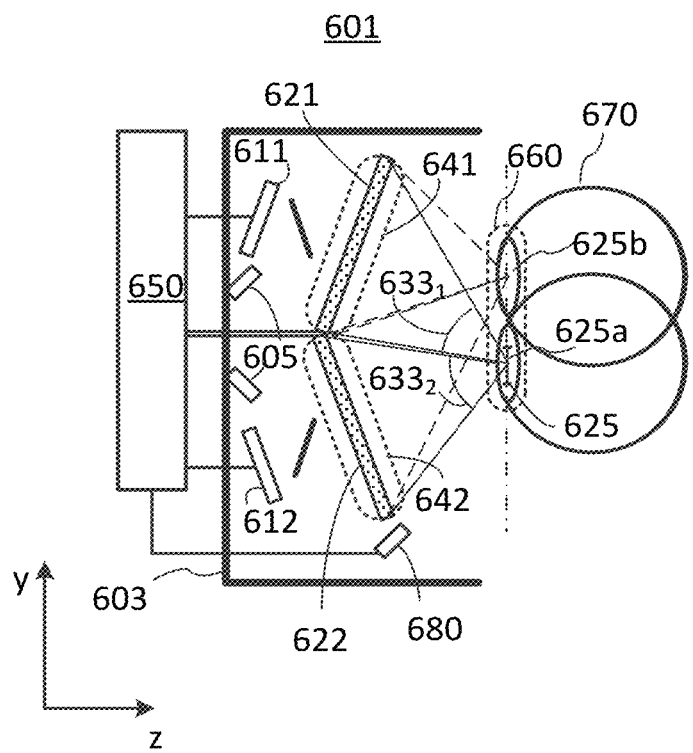
FIG. 6A is a schematic side cross-sectional view of a head-mounted VR display with SLM tiling for FOV broadening.

FIG. 6A schematically illustrates an example HMD 601 with SLM tiling for VR applications. HMD 601 may include a PSHP of the type illustrated in FIG. 2 supported by a rigid body or frame 603. Frame 603 may be configured for wearing on a user's head, with an exit pupil 625 steerable within an eyebox 660. HMD 601 includes SLM tiles 611, 612 disposed at a frontal side of frame 603, facing the eyebox 660. SLM tiles 611, 612 may also be referred to simply as SLMs 611, 612. The eyebox 660 defines possible positions of an ocular pupil of an eye 670 of the user when the user wears HMD 601; two different positions of the eye 670 is shown in FIG. 6A by way of example. Frame 603 may also support PSOs 641 and 642, which include WFMs 621, 622 and are optically coupled to SLM tiles 611, 612 respectively to transmit image beams to eyebox 660 and to provide FOV tiling and exit pupil steering, generally as described above. SLM tiles 611 and 612, PSOs 641 and 642, and WFMs 621 and 622 may be as described above with reference to SLM tiles $210_{1,2}$, PSOs $240_{1,2}$ and WFMs $220_{1,2}$ of FIG. 2. In operation SLM tiles 611, 612 are illuminated by coherent light beams from one or more light sources 605. The one or more light sources 605 may also be supported by frame 603, and may be for example as described above with reference to light sources 105. PSOs 641 and 642 are operable, using WFMs 621 and 622, to direct image beams from SLM tiles 611 and 612 to converge to any one of a plurality of supported exit pupil positions within the eyebox 660. Example supported exit pupil positions are indicated in FIG. 6A at 625a and 625b. It will be appreciated that in various embodiments PSOs 641 and 642 may be configured to steer the image beams from SLMs 611, 612 to a greater number of exit pupil positions within the eyebox 660, or in some embodiments to generally any position within the eyebox. HMD 601 may include two instances of the optics shown in FIG. 6A, one for each eye of the user.

In an HDM configured for VR applications, SLMs 611, 612 may be reflective and may be disposed in the line of sight of the user, as no external light needs to be transmitted into the user's eyes. PSOs 641, 642 may be disposed in optical paths between the SLMs 611, 612 and the eyebox 660, and configured to steerably transmit image beams from the SLMs 611, 612 to the eyebox 660. In one or more embodiments PSOs 641, 642 may form magnified virtual images encoded in the SLMs, which may be farther away from the eyebox 660 than the SLMs. The virtual images may then be projected by the crystalline lens and the cornea of the eye 670 onto a retina.

HMD 601 may further include an eye tracking module 680, which may include one or more eye-tracking cameras configured to provide eye position information. The eye tracking module 680, SLM tiles 611, 612, and WFMs 621, 622 may be operatively coupled to a controller 650, which may also be supported by frame 603. Controller 650 may include one or more processors and may be configured, for example programmed, to provide image information to SLMs 611, 612. Controller 650 may further be configured to control WFMs 621, 622 and, optionally, SLMs 611, 612 to steer the exit pupil in dependence on the eye position information provided by the eye tracking module 680. The eye position information may be indicative of a position of the ocular pupil of the user's eye 670 within the eyebox 660, which may in turn depend on the gaze direction. In operation, the eye tracking module 680 may provide the eye position information to controller 650, which may send control signals to WFMs 621, 622 and, optionally, SLMs 611, 612, to steer the image beams to one of the supported positions of the exit pupil 625 that best match the position of the eye of the user, e.g. deemed closest to the ocular pupil of the user's eye (e.g. exit pupil location 625a in FIG. 6A). As the position of the eye changes, controller 650 may signal WFMs 621, 622 and, optionally, SLMs 611, 612, to switch to new states associated with another exit pupil that better matches the new position of the user's eye (e.g. exit pupil position 625b in FIG. 6A).

In an example embodiment PSOs 641, 642 may be operable to focus the image beams from the SLM tiles 611, 612 to a common exit pupil with complementary FOVs $633_1$ and $633_2$, so as to provide an extended FOV generally as described above with reference to FIGS. 2, 4A and 4B, and to steer complementary FOVs $633_1$ and $633_2$ to a different exit pupil position in response to control inputs. In some embodiments PSOs 641, 642 may be operable to focus the two image beams from SLM tiles 611 and 612, respectively, to different exit pupils, for example to provide pupil replication.

Figure 6B:
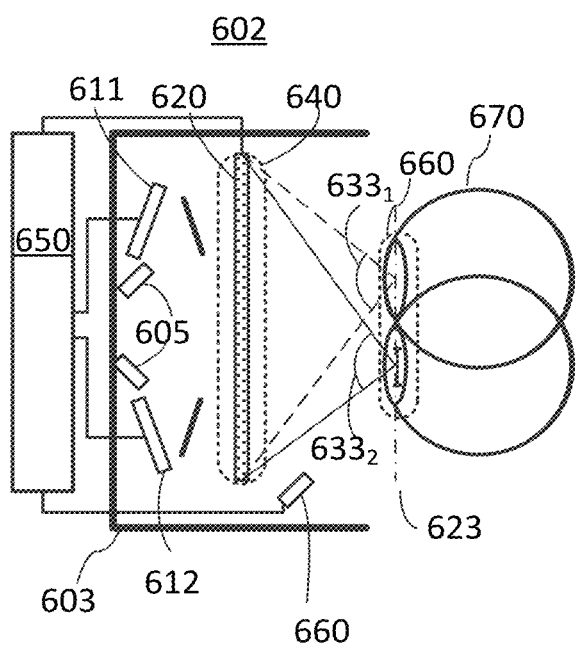
FIG. 6B is a schematic side view of a head-mounted VR display with SLM multiplexing.

FIG. 6B schematically illustrates an example HMD 602 with SLM tiling for VR applications. HMD 602 employs a PSHP of the type illustrated in FIG. 5 supported by a rigid body or frame 603. HMD 602 may include two instances of the optics shown in FIG. 6B, one for each eye of the user. In this embodiment, image beams from SLM tiles 611, 612 pass through a same WFM 620 but converge to different exit pupil positions. HMD 602 may operate generally as described above with reference to FIG. 5. WFM 620 may be a part of PSO 640, which in some embodiments may include optical elements that are optically coupled to both SLM tiles 611, 612. In some embodiments PSO 640 may include optical elements that are coupled to only one of the SLM tiles 611, 612. For each state of WFM 620, PSO 640 may support a plurality of exit pupils, two in the illustrated example, thereby supporting both pupil replication and pupil steering. In operation, the eye tracking module 680 may provide eye position information to controller 650, which may send control signals to WFM 620 to steer the image beams from SLMs 611 and 612 to a selected subset of exit pupil positions from the plurality of supported exit pupil positions, so that one of the exit pupils from the selected subset best matches the position of the eye of the user. As the position of the eye changes, another exit pupil of the selected subset within eyebox 606 may match the new eye position; if not, controller 650 may signal WFM 620 to switch to a new state associated with another, shifted, subset of exit pupil positions that better matches the new position of the user's eye.

PSOs 640, 641, 642 may include one or more other optical elements, such as but not exclusively: a convex lens, a concave lens, a Fresnel lens, an LC lens, a liquid lens, a pancake lens, an aperture, a grating, a filter, a polarizer and/or polarization converter, or any other suitable optical element. HMD 601 may also include various other elements, such as one or more positions sensors, one or more locators, an inertial measurement unit (IMU), and so forth, which may be coupled to frame 603, and in some instances may be at least in part positioned at the frontal side thereof. The eye tracking module 680 may include one or more camera(s) that may be disposed downstream or upstream of the PSO 641, 642, or 640, or be integrated into a respective PSO.

Figure 7A:
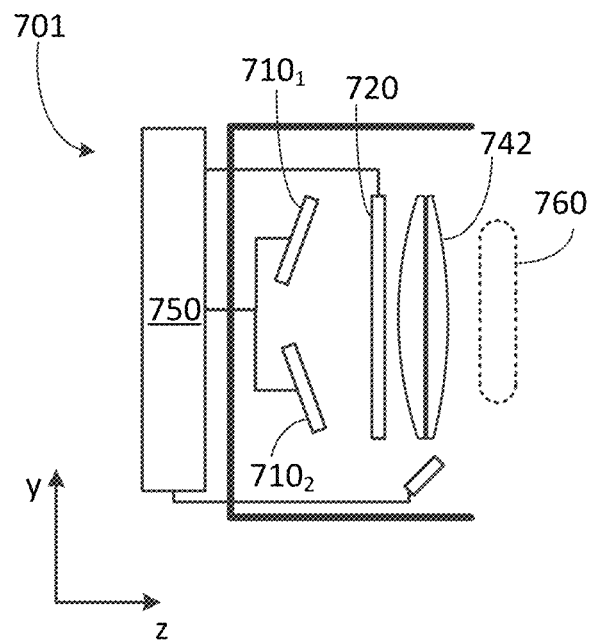
FIG. 7A is a schematic side cross-sectional view of a head-mounted VR display with SLM tiling and folding optic downstream of a WFM.

FIG. 7A illustrates an example HDM 701 with an optical device 742 downstream of a WFM 720. The optical device 742 may be for example a folded optics to reduce the distance from the WFM 720 to the eyebox 760, for example a pancake lens, a focusing lens, or some other suitable optical device or element. In the illustrated example HDM 701 includes a controller 750 operatively coupled to two SLM tiles $710_{1,2}$ and to WFM 720 disposed downstream of the SLM tiles $710_{1,2}$. HDM 701 may operate generally as described above with reference to FIGS. 5 and 6B. Although not shown, in at least some embodiments other optical elements may be present in the optical paths of the image beams emanating from the SLM tiles $710_{1,2}$. In some embodiments one or more pancake lenses or other pancake optics may be disposed upstream of WFM 720 in the optical paths of image beams emanating from SLMs 710. In such embodiments pancake lens 742 downstream of the WFM may be absent.

Figure 7B:
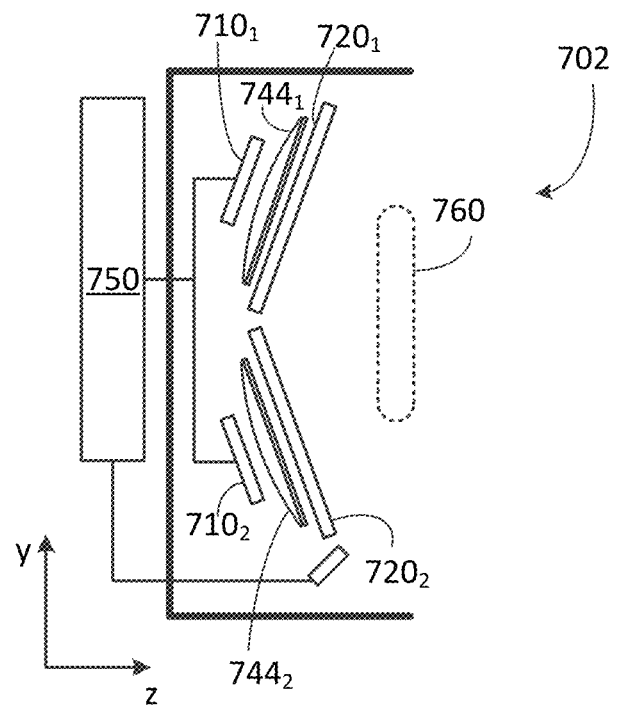
FIG. 7B is a schematic side cross-sectional view of a head-mounted VR display with SLM tiling and folding optics upstream of WFMs.

FIG. 7B illustrates an example embodiment where SLM tiles are coupled to different WFMs, and one or more optical devices such as focusing lenses and/or pancake optics disposed in the optical paths of image beams upstream from one or more of the WFMs. More particularly, FIG. 7B illustrates an example HDM 702 with SLM tiles $710_1$ and $710_2$ optically followed by WFMs $720_1$ and $720_2$, respectively, generally as described above with reference to FIGS. 2 and 6A, and with two pancake lenses $744_1$ and $744_2$ disposed in the optical paths of the respective image beams. Embodiments may also be envisioned where one of the pancake lenses $744_1$ or $744_2$ is absent. Embodiments where one or more pancake lenses or the like are added downstream of WFMs $720_1$ and/or $720_2$ would also be within the scope of the present disclosure.

Figure 8:
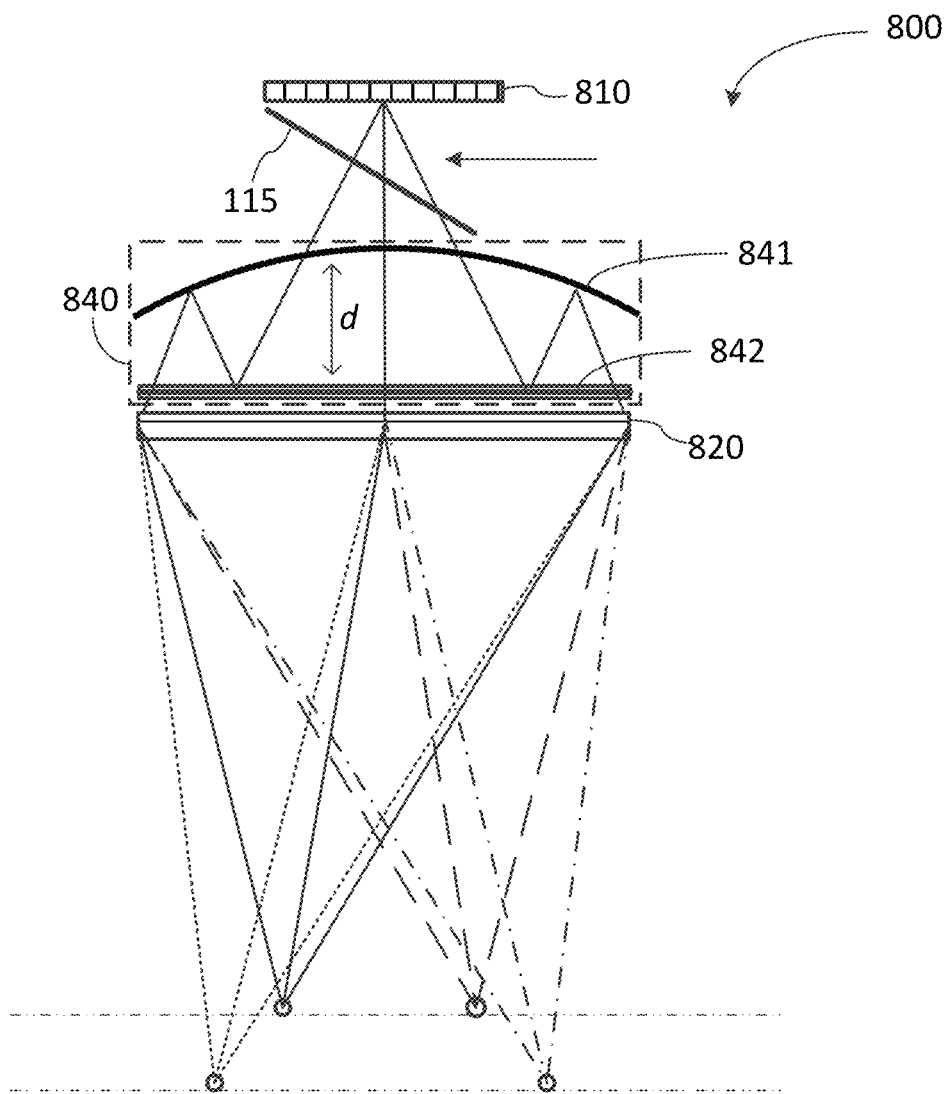
FIG. 8 is a schematic diagram of an example implementation of a holographic projector with a pancake assembly between an SLM and a WFM.

FIG. 8 illustrates an example holographic projector 800 including an SLM 810 that is optically followed by a WFM 820, with a folding optics assembly 840 disposed therebetween. Other optical elements may also be present, but are not shown to avoid clutter. SLM 810 and WFM 820 may be as described above, for example with reference to SLM 110 and WFM 120. In the illustrated embodiment the folding optics 840 is a pancake assembly that includes two reflectors 841 and 842, one or both of which may be curved to provide a desired focusing power; it may also be referred to as a pancake lens. The reflectors 841 and 842 form a cavity therebetween of thickness d. In one embodiment the first reflector 841 may be a partial reflector, for example a 50/50 reflector. The second reflector 842 may be a polarizing beam splitter. A quarter-wave plate (QWP) may be disposed between the reflectors, for example laminated onto reflector 842. In some embodiments a circular polarizer may be provided between SLM 810 and the pancake assembly 840, so that image light received by the first reflector 841 is circularly polarized. The optic axes of the QWP and the polarizing beam splitter 842 may be oriented to reflect back the image light at its first pass through the pancake cavity, and to transmit the image beam toward WFM 820 at its second pass, thereby folding the optical path of the image light. In some embodiments the thickness d of the pancake cavity may be dynamically adjusted to vary the focusing power of the pancake assembly 840, thereby moving the exit pupil of the projector in the z-axis direction. The pancake assembly 840 of holographic projector 800, or variants thereof, may be used in embodiments with tiled SLMs, such as those described with reference to FIGS. 2, 5, 6A-7B. One of the reflectors 841, 842 may be provided with an actuator (not shown) configured to move the reflector to vary the thickness d in response to a signal from a controller, such as controller 650 or 750 described above.

Figure 9:
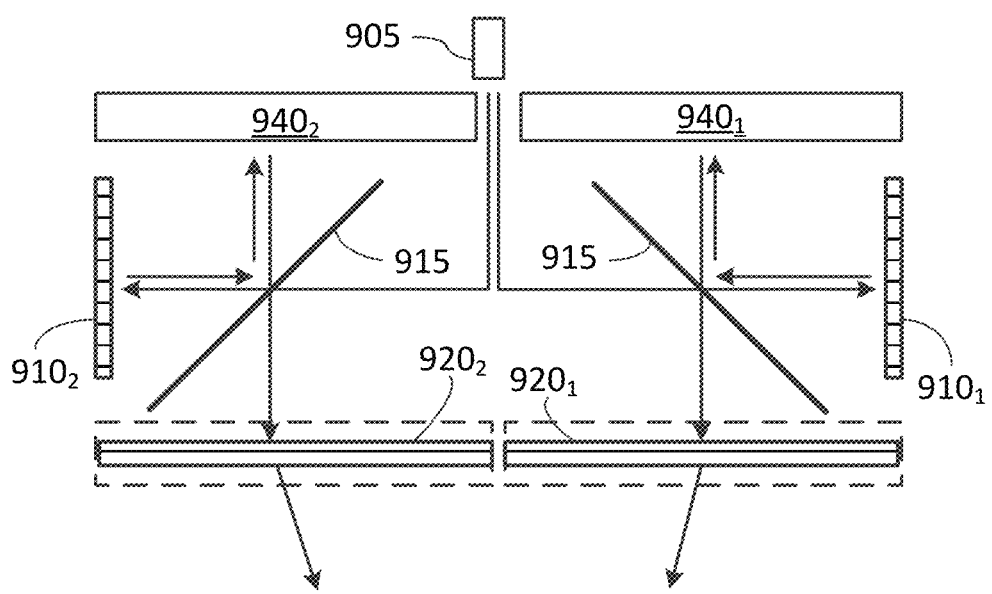
FIG. 9 is a schematic diagram of SLM tiles in a bird-bath folding optic architecture.

Other types of folding optics besides pancake lenses or assemblies may also be suitable for use in embodiments of the present disclosure to decrease the size of the projector or the HMD. FIG. 9 shows an example bird-bath architecture wherein image beams from SLM tiles $910_1$, $910_2$ are directed toward one or more WFMs, such as WFMs $920_1$, $920_2$ in the illustrated example, along folded optical paths in a bird-bath optic arrangement. Polarized light beams from a same light source 905 or two separate light sources are individually directed to SLM tiles $910_{1,2}$ using one or more beam splitters 915. The beam splitters 915 direct image beams reflected from the SLMs toward respective reflective optic $940_1$, $940_2$. Image beams reflected from the reflective optic $940_1$, $940_2$ may then be directed toward the WFMs $920_1$, $920_2$. Reflective optic $940_1$, $940_2$ may include reflectors, such as for example flat mirrors or curved mirrors to change the beams' convergence, for example to focus or collimate the beams. Reflective optic $940_1$, $940_2$ may further include other optical elements such as, but not exclusively one or more waveplates, one or more polarization rotators, one or more lenses, and the like. Beam splitters 915 may be polarization beam splitters; in some embodiments one or more wave plates, such as quarter wave plates (QWP), may be provided in the path of the image beams to support the desired beam routing. In some embodiments, the WFMs $920_1$, $920_2$ may be configured to output image beams at somewhat different angles to support an extended FOV or pupil replication as described above. In some embodiments one or both WFMs 920$_1$, 920$_2$ may tilt toward each other to facilitate the direction of the image beams toward a same steerable exit pupil. In some embodiments, additional optical elements, such as beam deflectors, may be provided upstream or downstream of the WFMs to direct different image beams from the SLMs at desired differing angles.

Figure 10A:
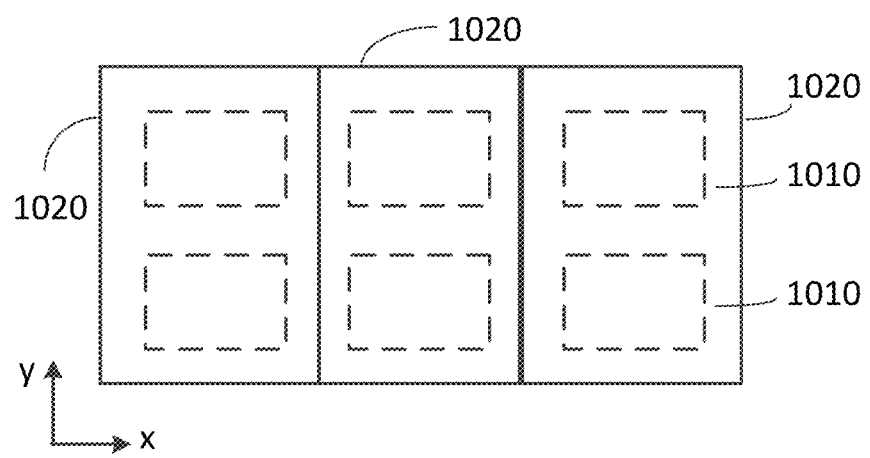
FIG. 10A is a schematic plan view of a 3×2 SLM array coupled to a pupil steering optic with 2×1 WFM multiplexing for a holographic display system with FOV and eye box expansion.
Figure 10B:
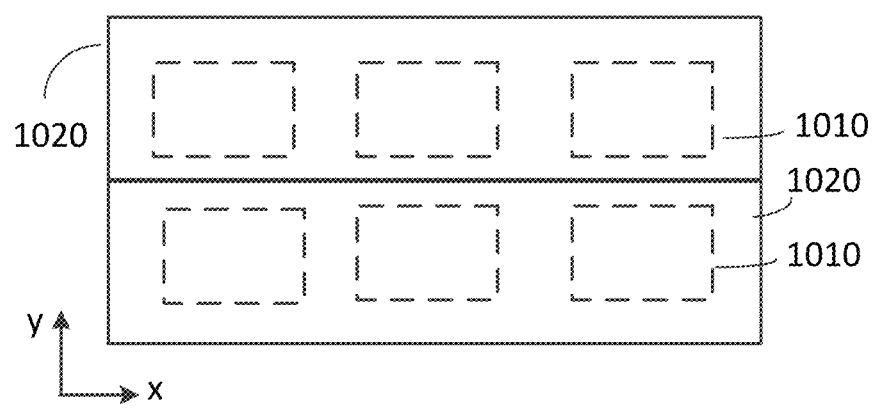
FIG. 10B is a schematic plan view of a 3×2 SLM array coupled to a pupil steering optic with 3×1 WFM multiplexing for a holographic display system with FOV and eye box expansion.

Although example display devices, such as holographic projectors and HMDs illustrated above, were described with reference to two SLM tiles, different embodiments may use different numbers of SLM tiles to provide enhanced steerable FOV and/or an expanded eyebox with steerable pupil replication. FIGS. 10A and 10B illustrate example tiling architectures of an PSHP with M=6 SLM tiles 1010 arranged in a 2×3 array, with two rows of SLM tiles, three SLM tiles in each row. In these examples, the rows extend along the horizontal axis (x), which may correspond to an axis connecting the user's eyes, while the columns extend along the vertical axis (y), which may correspond to the up-down direction as perceived by the user. Embodiments illustrated in FIGS. 10A and 10B include fewer WFMs than SLM tiles, and may combine pupil replication with FOV expansion, and 2D or 3D pupil steering. In other embodiments the number of SLM tiles in the vertical and/or horizontal directions may be different than those illustrated in FIGS. 10A and 10B. Embodiments with different arrangements of SLM and/or WFM tiles, for example diagonal or circular, may also be contemplated.

In FIG. 10A, the SLM tiles 1010 are coupled to three distinct WFMs 1020, so that each two vertically-disposed SLM tiles 1010 are coupled to a same instance of WFM 1020. The arrangement may provide pupil replication in one direction, for example the vertical (y-axis), and a FOV expansion in the other direction, for example the horizontal (x-axis), with 2D or 3D pupil steering. The horizontal FOV expansion may be up to three-fold in embodiments where partial FOVs supported by each SLM 1010 are of about the same angular width in the horizontal direction.

In FIG. 10B, the SLM tiles 1010 are coupled to two distinct WFMs 1020, so that the SLM tiles in each SLM row are coupled to a same instance of WFM 1020, while the two SLMs in each column are coupled to different WFMs 1020. The arrangement may provide pupil replication in the horizontal direction (x-axis), and a FOV expansion in the vertical direction (y-axis), with 2D or 3D pupil steering. The vertical FOV expansion may be up to two-fold in embodiments where partial FOVs supported by each SLM 1010 are about the same angular width in the vertical direction.

Figure 11:
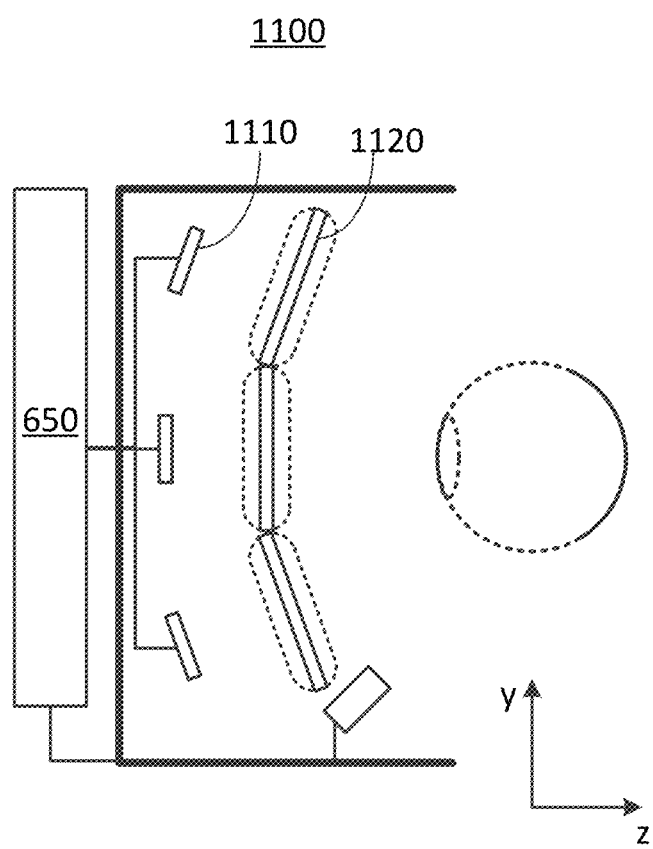
FIG. 11 is a schematic side cross-section of a VR head-mounted display with three SLM tiles for FOV or eyebox expansion in a vertical plane.

FIG. 11 schematically illustrates, in a vertical cross-section, an example embodiment 1100 in which three vertically disposed SLM tiles 1110 are individually coupled to three different WFMs 1120; in some embodiments this arrangement may provide an approximately three-fold increase in a vertical FOV, and a 2D or 3D pupil steering. Additional SLM tiles and, optionally, additional WFMs may be disposed in a horizontal direction normal to the plane of the figure. FIG. 11 illustrates the SLM/WFM arrangement for one eye of the user; it will be appreciated that a corresponding HDM may include a second similar arrangement for the second eye of the user, with another three SLMs coupled to another three WFMs to provide an enhanced steerable FOV for the second eye.

Figure 12:
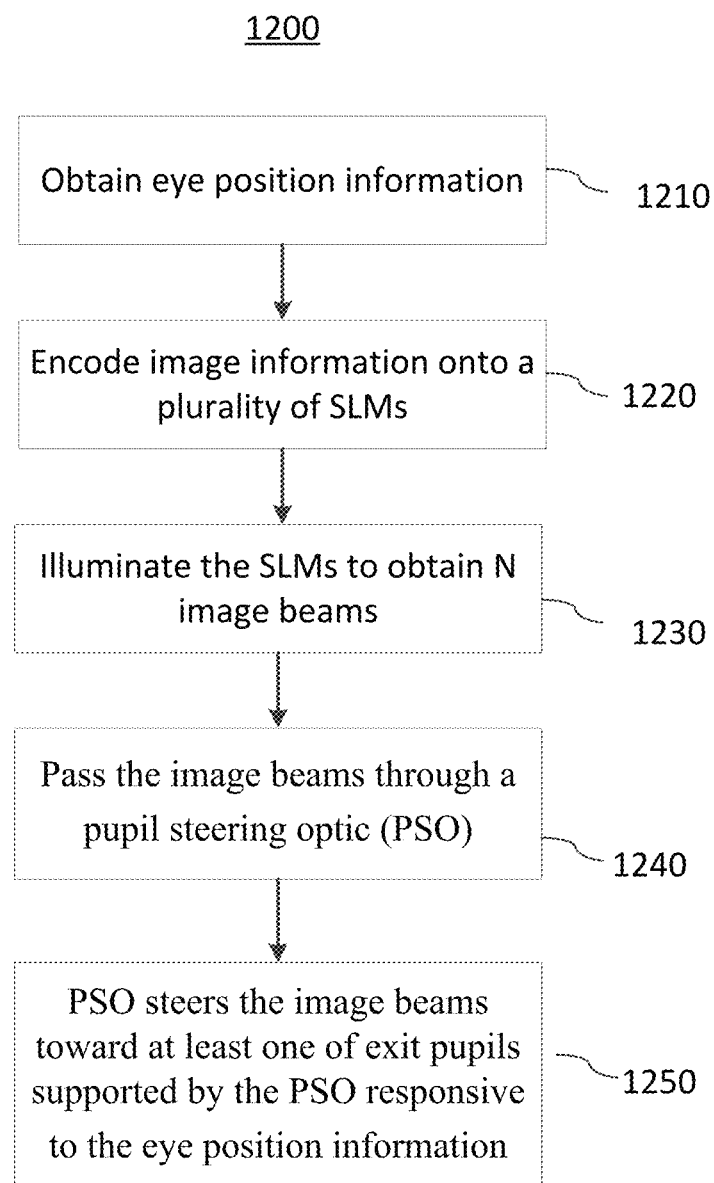
FIG. 12 is a flowchart illustrating a method for operating a pupil-steering holographic projector according to an embodiment.

FIG. 12 illustrates a method 1200 for displaying images to the user. Method 1200 may be implemented with a display device, example embodiments of which are described herein with references to FIGS. 1A-11, such as PSHP 100, 200, 500, HMD 601, 602, 1100, and variants or modifications thereof. Method 1200 may include several steps or operations, which are illustrated in FIG. 12 as blocks. Although the flowchart in FIG. 12 shows these steps or operations in a particular sequence, it will be appreciated that at least some of the steps shown may be performed in parallel, or in a different order.

In the illustrated embodiment, method 1200 includes step or operation 1210, in which eye position information for an eye of the user is obtained, for example using an eye tracking module or system as described above. At step or operation 1220, image information may be encoded onto a plurality of M>1 SLMs, for example electrically with signals obtained from a processor where digital images are generated, processed, or stored. At step or operation 1230, the SLMs are illuminated by light beams. The individual light beams illuminating each, or at least some, of the SLMs may be at least partially coherent, i.e. have wavefronts that are substantially coherent in at least one direction across the light-processing areas of respective SLMs. In some embodiments where the SLMs are pixelated, the illuminating wavefront may be spatially coherent across a plurality of SLM pixels, so as to facilitate encoding of phase information into a modulated wavefront of a reflected image beam. In some embodiments one or more of the SLMs may be encoded with a phase function that imparts a beam directing or beam deflecting capability and/or focusing power onto the SLM, such as but not limited to a linear phase function or a phase function with a circular symmetry.

At step or operation 1240, the plurality of image beams is passed through, or reflected from, a pupil steering optic which is configured to operate in a plurality of PSO states supporting a plurality of exit pupil locations, such as any of the PSOs described in this disclosure document. In one or more embodiments of the method, the PSO may, in at least some of its states, steer the image beams so that they are received at one or more of the exit pupil locations in distinct FOVs, such as represented by angles 233$_1$ and 233$_2$ in FIG. 2, angles 433$_1$ and 433$_2$ in FIGS. 4A, 4B, angles 633$_1$ and 633$_2$ in FIG. 6A. At step or operation 1250, the pupil steering optic may be operated to steer the plurality of image beams toward at least one of the supported exit pupil locations responsive to the eye position information obtained at step 1210.

With reference to FIGS. 13-20, embodiments described herein may utilize liquid crystal (LC) based WFMs, which may include LC elements that operate in a polarization-sensitive manner, and which may operate without substantially discriminating between orthogonal polarizations in transmitted optical power. Such devices include, but are not limited to, LC PBP lenses, LC PBP gratings, LC volume holographic gratings, and LC polarization switches.

Figure 13:
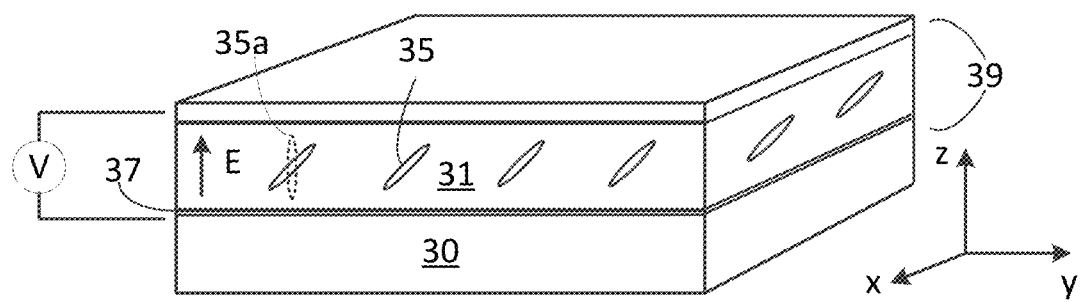
FIG. 13 is a schematic perspective view of a liquid crystal (LC) polarization device.

Referring first to FIG. 13, LC devices described herein may include an LC layer 31 supported by a transparent or reflective substrate 30. Substrate 30 may be flat or curved. The polarization properties of such devices may depend on the material properties of the LC layer 31, orientation of LC molecules 35 within the layer, the chirality of the LC molecules 35, the thickness of the LC layer 31, and the wavelength λ of incident light. A predominant orientation of the LC molecules at any location (x,y,z) in the LC layer may be conveniently represented by a unit vector n(x,y,z) termed an LC director, n(x,y,z)=−n(x,y,z). Here a Cartesian coordinate system (x,y,z) is used for convenience in which the (x,y) plane is parallel to the plane of the LC layer 31. Within the LC layer 31 the orientation of the LC director may be defined at least in part by an alignment layer or layers 37 that may be disposed immediately adjacent to the LC layer 31. An LC device in which the orientation of LC molecules is generally uniform across the LC layer may operate as a waveplate retarder. For incident light of a specific polarization, an LC device in which the orientation of the LC director varies in the plane of the layer may function, non-exclusively, as a lens, as a grating, or as a de-polarizer, depending on the LC director orientation pattern.

An LC device may be active, where the LC material orientation is electrically controlled, or passive, where the LC material orientation is fixed in place via material properties, for example by the alignment layers and/or by a polymer mixed into the LC fluid and cured at a particular orientation within the LC layer. An active LC device may be constructed with the LC layer 31 sandwiched between two electrodes 39, at least one of which is transparent in the wavelength range of intended operation. In embodiments operating in transmission, both electrodes 39 may be optically transparent. Transparent electrodes 39 may for example be in the form, or include, ITO (indium tin oxide) layers. In the absence of voltage between the electrodes, the LC molecules 35 may be oriented in a default pattern that imposes desired birefringence properties on the device, for example a desired uniform or non-uniform retardance. Applying a sufficient voltage V between the electrodes 39 may reversibly re-align LC molecules 35 in a way that changes birefringent properties of the LC layer. For example, in some LC materials applying a sufficient voltage V to the electrodes 39 may align the LC molecules along the electric field, as indicated at 35a in the figure, so that the LC layer 31 will lose its birefringence for light at normal or close to normal incidence. An example of an active LC device is an active waveplate which retardance may be switched off and back on by applying a voltage V and by turning the voltage off, respectively. For example, an active LC device may be constructed to provide a retardance of a half-wave plate (HWP) in the absence of applied voltage, and substantially zero retardance when a sufficient voltage V is applied. One or more embodiments described herein may utilize such switchable HWPs, hereinafter referred to as s-HWP, as a polarization switch for polarized light. For example a suitably oriented s-HWP may reverse the chirality of circular polarized (CP) light incident thereon in the absence of voltage (OFF state), and may leave the incident polarization state unchanged in the presence of voltage (ON state). The relationship between the applied voltage and the polarization action of an LC waveplate may be reversed in other embodiments.

Figure 14:
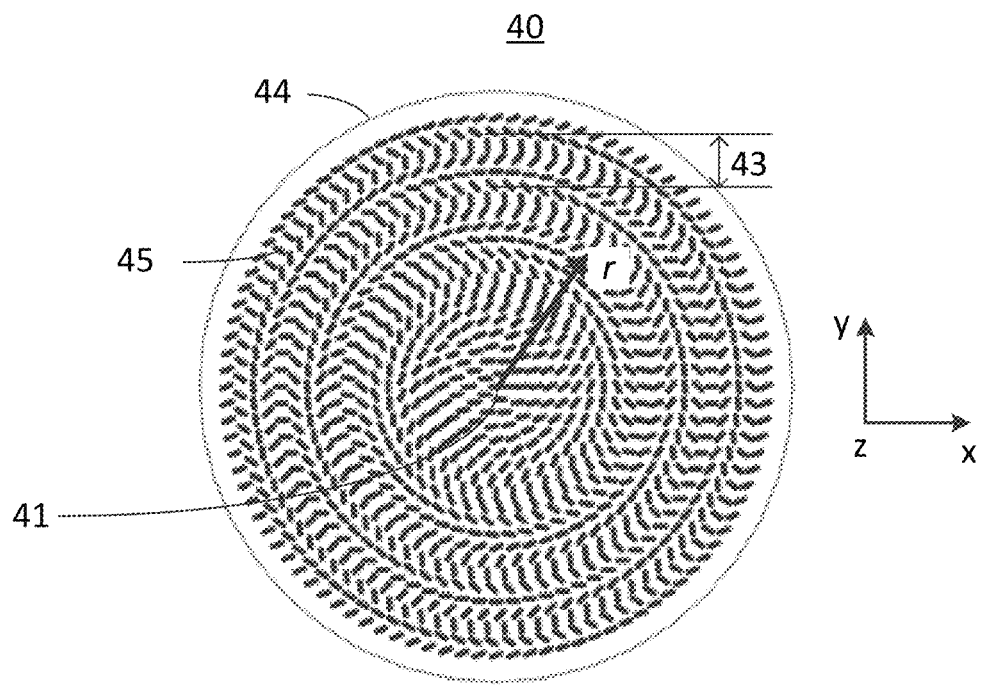
FIG. 14 is a schematic diagram illustrating an example LC orientation pattern of an LC PBP lens in the plane of the LC layer.

Referring to FIG. 14, a Pancharatnam-Berry phase (PBP) lens 40 with desired polarization processing and focusing properties may be fabricated with the orientation of LC molecules 45 radially varying in plane of the LC layer and, possibly also in in the direction normal thereto, i.e. relative to an optical axis of the LC device (z-axis in FIGS. 13-16). The LC azimuth angle θ, i.e. the angle of rotation of a projection of the LC director onto the plane (x,y) of the LC layer, may vary radially from a center 41 to an edge 44 of the lens 40, with a varied pitch 43 Λ. The pitch Λ indicates a distance across which the azimuth angle θ of the LC director is rotated by 180°, and may be a function of the radial distance r from the center 41 of the PBP lens. Polarized light beam passing through such lens experiences radius-dependent retardance that adds a varying phase shift across the beam's wavefront, resulting in a lensing action for a suitably selected profile of the LC orientation. In some embodiments the azimuth angle θ of the LC orientation in the PBP LC lens 40 may vary in accordance with the equation $$\theta(r) = \frac{\pi r^2}{2 f_0 \lambda_0}$$

where $f_0$ corresponds to the focal length of the PBP lens 40, and $\lambda_0$ corresponds to the wavelength of incident light on the lens. In other embodiments the tilt angle φ of the LC molecules of an PBP lens, i.e. the angle describing the molecules' tilt relative to the optical axis of the lens, may be radially varying to provide a desired phase profile. Such a lens may be either active, where the LC material orientation is electrically controlled, or passive, where the LC material orientation is fixed in place via material properties and/or alignment layers. An active LC PBP lens may be constructed as described hereinabove with reference to FIG. 2. For example, optical power and polarization switching property of an active LC PBP lens may be turned off by applying a suitable voltage across the LC layer to switchably align the LC molecules along the optical axis of the lens (z-axis). The state of an active LC PBP lens in which it has a substantially zero optical power, or am optical power that is smaller than a threshold value, may be referred to as a neutral state. The state of an active LC PBP lens in which it has a desired non-zero nominal optical power may be referred to as a neutral state. A PBP lens 40 is an example of a polarization-controllable or polarization-sensitive lens which focusing power depends on the polarization of incident light, and other types of such polarization-sensitive or polarization-controllable lenses may also be used in various embodiments.

Figure 15:
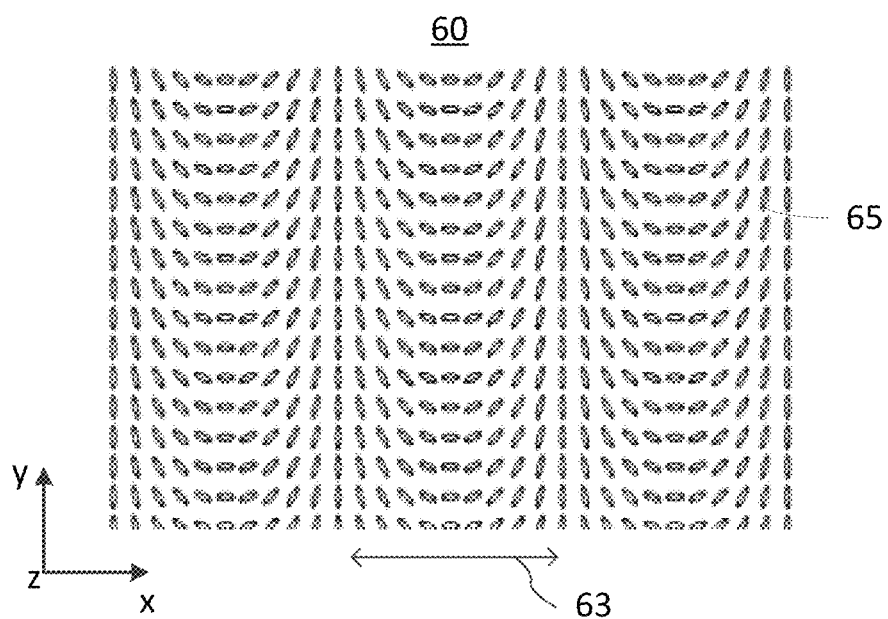
FIG. 15 is a schematic diagram illustrating an example LC orientation pattern of an LC PBP grating in the plane of the LC layer.

Referring to FIG. 15, an LC device 60 in which the orientation of the LC director varies periodically or nearly periodically in one dimension (1D) along a specific direction in the plane of the LC layer may function as a polarization grating. A polarization grating may direct incident light at an angle that depends on the grating's pitch and a polarization state of the incident light. One example of an LC polarization grating is a PBP grating, in which grating 'groves' are formed by spatially varying birefringence in the plane of the grating. The LC director, which in the figure is represented by "LC molecules" 65, in such grating varies its orientation in the plane of the LC layer, indicated in the figure as an (x,y) plane, defining a device birefringence profile in the plane of the LC layer. The azimuth angle θ of the LC director 65 in the plane of the grating continuously changes from one edge to the other, typically with a fixed pitch 63. An LC PBP grating may be either active, where the LC material orientation is electrically controlled, or passive, where the LC material orientation is fixed in place via material properties and/or alignment layers or passive. An active LC PBP grating may be constructed as described above with reference to FIG. 13, so that its diffractive power may be switched OFF.

Figure 16A:
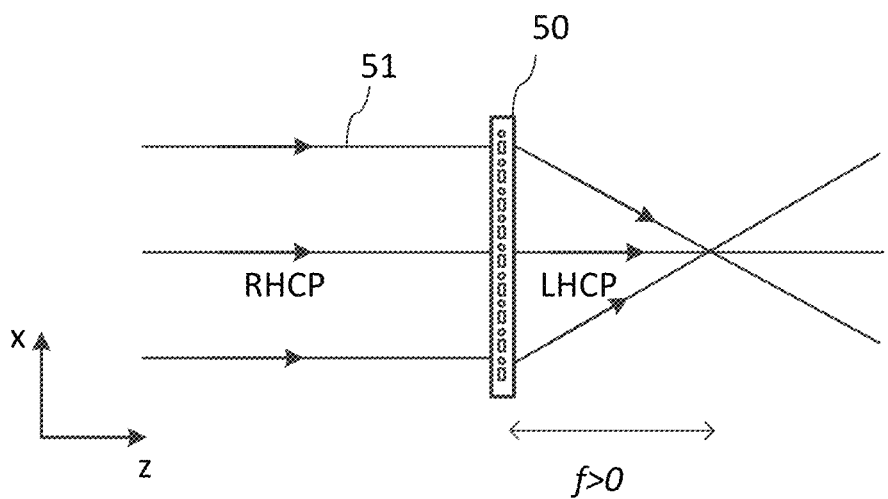
FIG. 16A is a schematic diagram illustrating the operation of an example PBP lens for RHCP light.
Figure 16B:
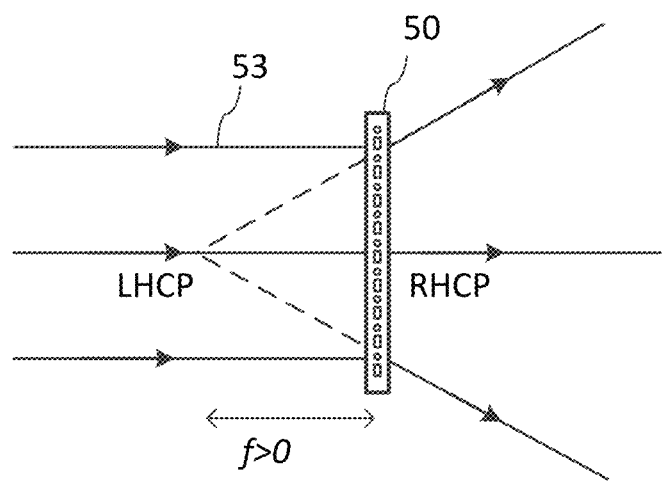
FIG. 16B is a schematic diagram illustrating the operation of an example PBP lens for LHCP light.

FIGS. 16A and 16B illustrate the operation of an example PBP lens 50, with a focal length f, for left-handed circular polarized (LHCP) light (FIG. 15B) and right-handed circular polarized (RHCP) light (FIG. 16). In this example, PBP lens 50 has a positive optical power for LHCP light while switching its polarization to RHCP, and a negative optical power for RHCP light while switching its polarization to LHCP. Thus a collimated LHCP beam 51 exits the lens as a converging RHCP beam that converges to a focus at a distance f from the lens, while a collimated LHCP beam 53 exits the lens as a divergent LHCP beam that appears to diverge from a virtual focus at a distance −f from the lens.

The focal length f of the PBP lens defines its nominal optical power 1/f, which may also be referred to herein as the focusing power.

Figure 17:
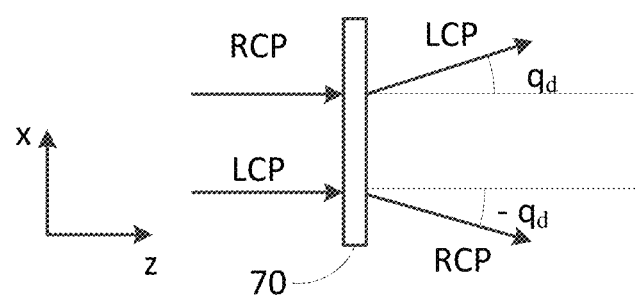
FIG. 17 is a schematic diagram illustrating the operation of a PBP grating for RHCP and LHCP light.

FIG. 17 illustrates the operation of an example PBP grating 70 configured to deflect RHCP light by a diffraction angle $\theta_d$ in one direction and to deflect LHCP light in an opposite direction, generally by the same diffraction angle $\theta_d$. In both cases the PBP grating 70 switches the circular polarization to its orthogonal polarization. The pitch of an LC PBP grating may be configured to provide a desired magnitude of the diffraction angle $\theta_d$. Such a grating may be either active, where the LC material orientation is electrically controlled, or passive, where the LC material orientation is fixed in place via material properties and/or alignment layers. An active LC PBP grating may be constructed as described hereinabove with reference to FIG. 13. For example, an active LC PBP grating may deflect incident CP light by the diffraction angle $+\backslash-\theta_d$ depending on the chirality of incident light while simultaneously reversing its chirality in the absence of voltage (OFF state), and may leave both the direction of propagation and the polarization state of incident light unchanged in the presence of voltage (ON state). A PBP grating is an example of a polarization grating. Another example of a polarization grating is a volume holographic LC grating, in which the orientation of the LC layer material may vary both in the plane of the LC layer and in the direction normal to the LC layer, which may be referred to as the thickness direction. Such gratings may be constructed to selectively deflect only one of two orthogonal linear polarizations, without substantially changing the propagation direction of the other of the two orthogonal polarizations. The volume holographic LC grating may operate, for example, as an active element where the LC material is electrically controlled, and/or as a passive element, together with a linear polarizer and an active polarization rotator operable to switch the polarization status of the incident light. Embodiments described below with reference to LC PBP gratings may be modified to use such volume holographic LC gratings instead.

Figure 18:
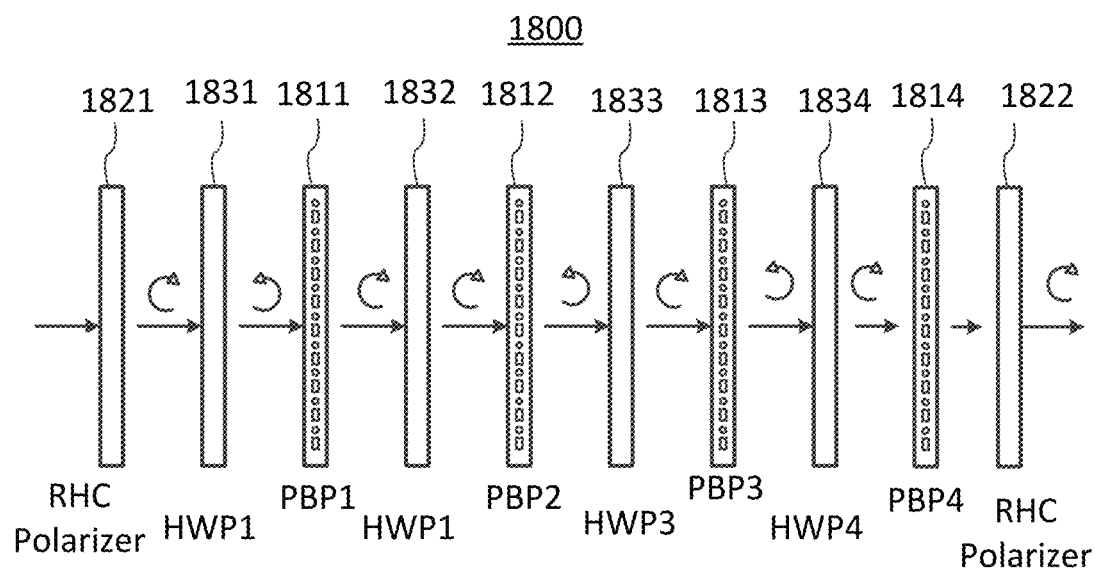
FIG. 18 is a schematic diagram illustrating an example polarization-switchable LC stack operable as a WFM.
Figure 19:
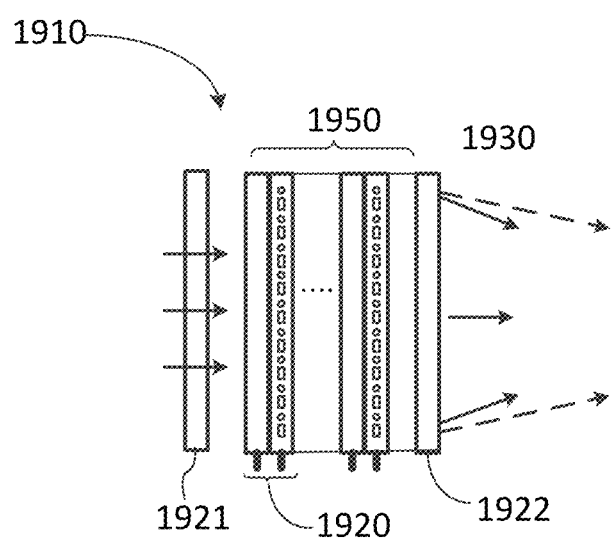
FIG. 19 is a schematic diagram illustrating an integrated implementation of a polarization-switchable LC stack.

FIG. 18 illustrates an expanded side view of an example LC stack 1800 that may be used as a WFM in pupil-steering displays, including holographic projectors example embodiments of which are described above. The LC stack 1800 includes four PBP elements 1811-1814, each paired with a polarization switch in the form of a switchable HWP (s-HWP) 1831, 1832, 1833, or 1834. An input circular polarizer (CPr) 1821 may be provided to convert input beam to a circular-polarized beam. In the illustrated embodiment CPr 1821 outputs a right-hand circular (RHC) polarization, but it may also output a left-hand circular (LHC) polarization in other embodiments. A clean-up CPr 1822 may be provided at the output of the LC stack 1800. PBP elements 1811-1814 may be all passive, all active, or may combine active and passive PBP elements. Generally an LC stack implementing a switchable WFM may include any number K≥1 of polarization controllable beam shaping and/or deflecting elements, such as PBP elements, at least some of which preceded or followed by a polarization switch such as an s-HWP. Elements of the stack may be sequentially laminated on a common surface or carrier, with sequential elements optionally sharing a substrate, to provide an integrated LC stack, as illustrated in FIG. 19. A PBP element preceded or followed by an s-HWP may be referred to as a polarization-switchable unit or a polarization-switchable element.

FIG. 19 illustrates an example embodiment in which K≥1 polarization-switchable units 1920 of a switchable LC stack 1910 are stacked to form a switchable LC block 1950, which may be sandwiched between two CP polarizers 1921 and 1922. In some embodiments the input CP polarizer 1921 may be commonly laminated to be a part of the switchable LC block 1950, or may be disposed upstream of the LC block 1950.

Figure 20A:
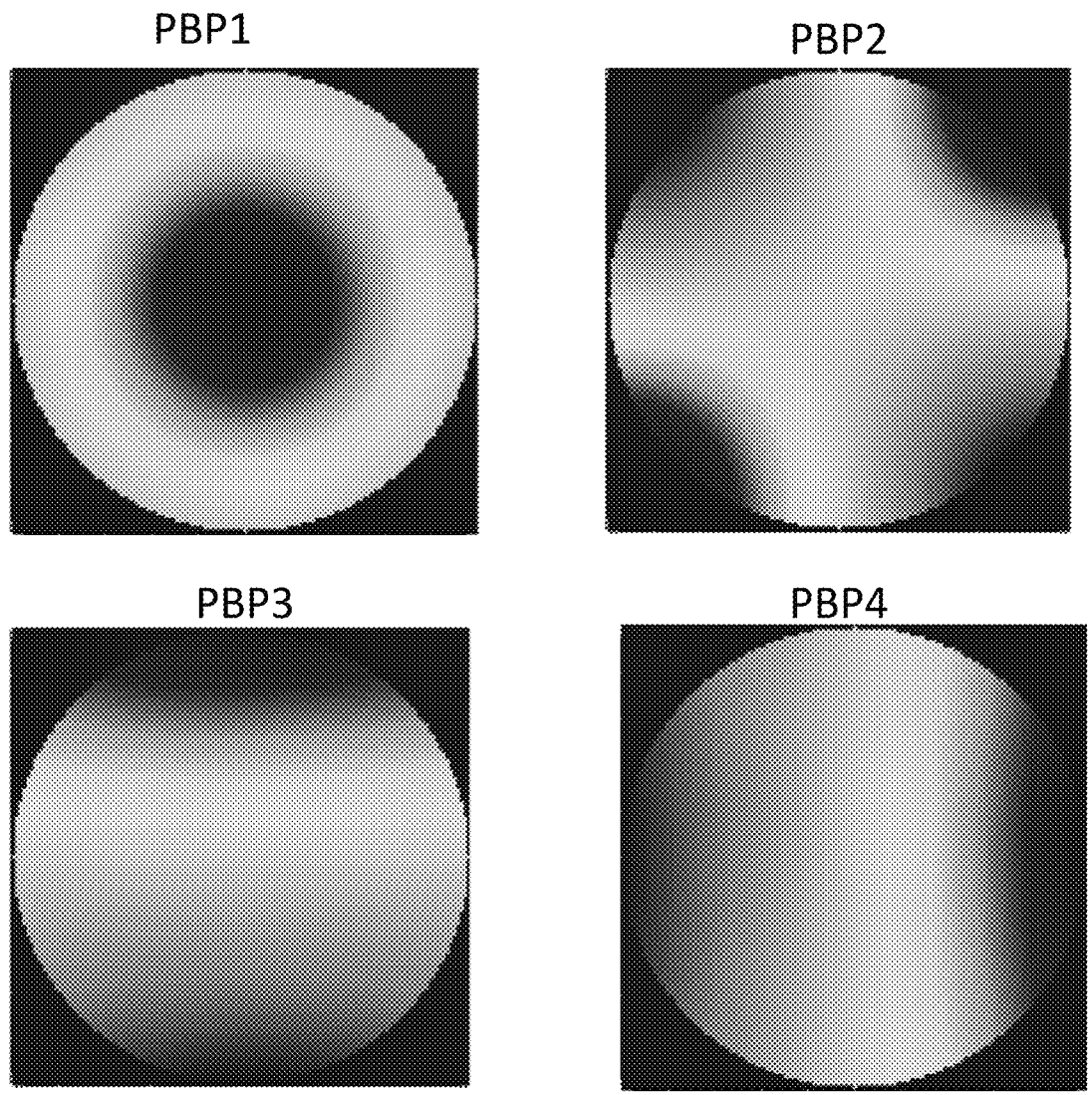
FIG. 20A is a diagram illustrating example phase properties of the four PBP elements of the polarization-switchable LC stack of FIG. 18.

FIG. 20A illustrates example symmetry properties of the four PBP elements 1811-1814, denoted as PBP1, PBP2, PBP3, and PBP4, in one example implementation of the LC stack 1800. In this implementation PBP1 has a rotational symmetry as illustrated in FIG. 14 and operates as a varifocal PBP lens. PBP3 and PBP4 may have single-plane symmetry, with LC orientation patterns defining linear phases oriented at 90 degrees to each other; they may operate generally as polarization grating. PBP 2 may have a two-plane symmetry, and may have an LC orientation structure designed to at least partially correct for various aberrations in the system including but not limited to image beam ellipticity at the planes of the exit pupil. It will be appreciated that the example symmetries of the four PBP elements 1811-1814 represent just one possible option, and the PBP elements of an LC stack may be configured in various ways to realize desired focusing and steering properties of an WFM.

Figure 20B:
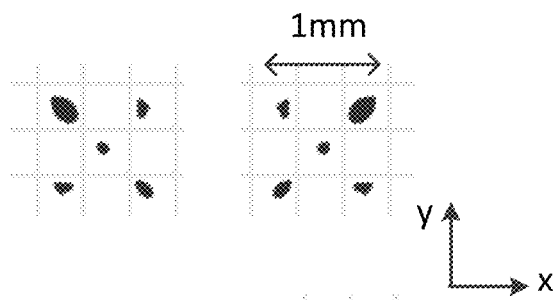
FIG. 20B is a diagram illustrating four co-planar exit pupils of an example holographic display system using the switchable LC stack of FIG. 18 for pupil steering.

Table 1 summarizes an example operation of the LC stack 1800 with passive PBP elements 1811-1814. In this example the LC stack 1800 may be switchable between eight states providing eight exit pupils positioned in two pupil planes, with four exit pupils at a smaller eye relief distance (ER) denoted in Table 1 as "Near", and another four exit pupils at a greater eye relief distance (ER) denoted in Table 1 as "Far". The last for rows in Table 1 indicate a state of each PBP element for each exit pupil positon, with the plus "+" and minus "−" signs indicating the two states of the associated polarization switch, or equivalently the two opposite polarization states at the input of the corresponding PBP element. FIG. 20B illustrate spot diagrams for the four exit pupils at a same ER.

By way of example, a PSHP implementation with one or more WFMs utilizing the LC stack 1800 as described above may include one or more SLMs each comprising a 2K×2K array of programmable LCOS pixels with a pixel pitch 3 μm and $+\backslash-5.3°$ diffraction angles. The LC stack 1800 may deflect an incident image beam by $+\backslash-8°$ in two orthogonal planes, as defined at least in part by PBP3 and PBP4, with the distance (ER) from the LC stacks to the exit pupil plane switchable to 14 mm and 16 mm, as defined at least in part by PBP1. The example PSHP implementation may include a focusing lens upstream of each LC stack 1800 providing a 6:1 magnification from the SLM to the exit pupil, a pupil size of 1 mm×1 mm, an angular resolution of 2.3' at 550 nm wavelength, and a FOV of 64°×64° from one SLM tile. An embodiment with 2×2 SLM tiles coupled to 2×2 WFM tiles as described above may provide a FOV of up to 128°×128°.

TABLE 1

| | | Pupil # | | | | | | | |
|---|---|---|---|---|---|---|---|---|---|
| | | 1 | 2 | 3 | 4 | 5 | 6 | 7 | 8 |
| Pupil Position | Eye Relief XY Quadrant | Near 1 | Near 2 | Near 3 | Near 4 | Far 1 | Far 2 | Far 3 | Far 4 |
| PBP1 (Rotation Symmetry) | | + | + | + | + | − | − | − | − |
| PBP2 (2Plane Symmetry) | | + | − | + | − | + | − | + | − |
| PBP3 (Plane Symmetry 1) | | + | + | − | − | + | + | − | − |
| PBP4 (Plane Symmetry 2) | | + | − | − | + | + | − | − | + |

Figure 21A:
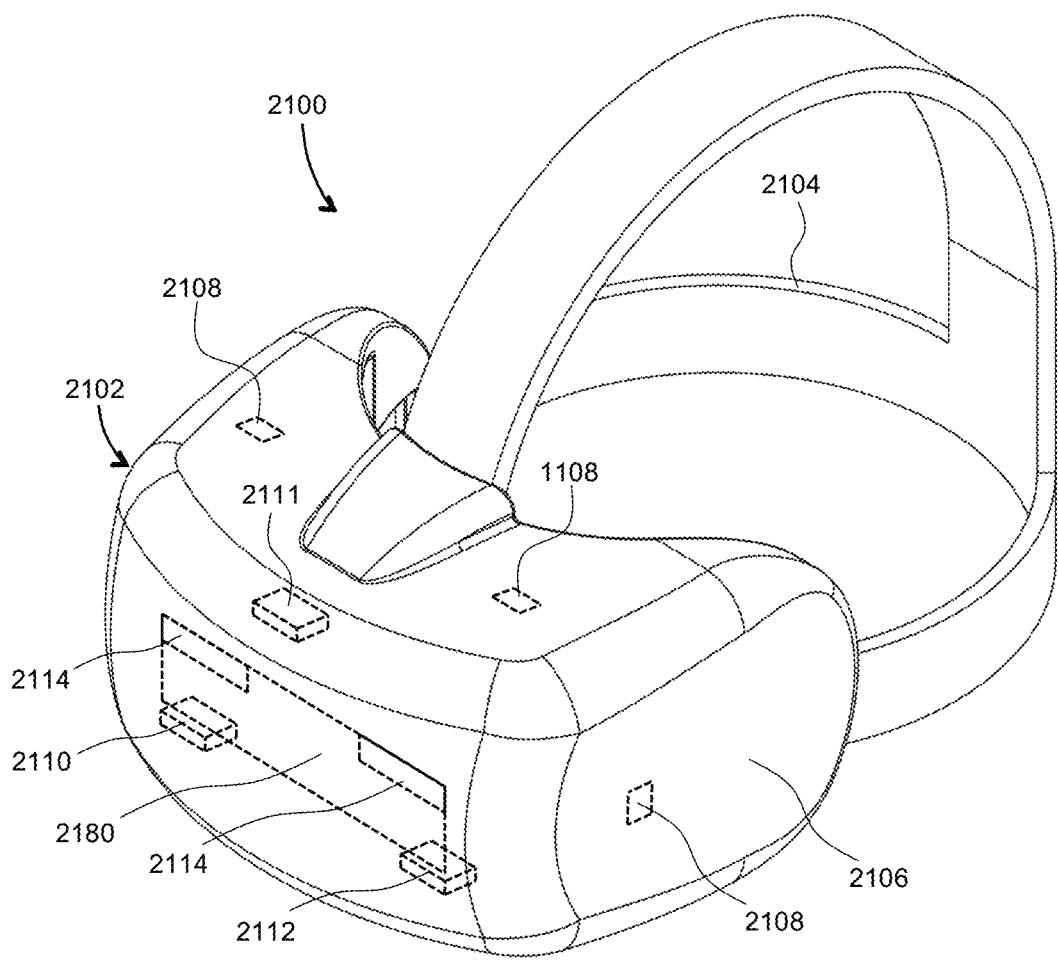
FIG. 21A is an isometric view of a headset (head-mounted display) of the present disclosure.

Referring to FIG. 21A, an HMD 2100 is an example of a VR wearable display system which encloses the user's face for a greater degree of immersion into the VR environment. The HMD 2100 may be an embodiment of the display systems described above with reference to FIGS. 1, 2, 4-12. The function of the HMD 2100 is to provide computer-generated 2D or 3D virtual imagery to the user. The HMD 2100 may include a front body 2102 and a band 2104. The front body 2102 is configured for placement in front of eyes of a user in a reliable and comfortable manner, and the band 2104 may be stretched to secure the front body 2102 on the user's head. A display engine 2180 for presenting imagery to the user may include one or more image generators 2114, which may be disposed in the front body 2102 or adjacent thereto, and which may be followed by pupil steering optic 2180 as described above. The image generators 2114 may include one or more SML tiles for encoding holographic image information on incident light beams. Sides 2106 of the front body 2102 may be opaque or transparent.

In some embodiments, the front body 2102 includes locators 2108 and an inertial measurement unit (IMU) 2110 for tracking acceleration of the HMD 2100, and position sensors 2112 for tracking position of the HMD 2100. The IMU 2110 is an electronic device that generates data indicating a position of the HMD 2100 based on measurement signals received from one or more of position sensors 2112, which generate one or more measurement signals in response to motion of the HMD 2100. Examples of position sensors 2112 include: one or more accelerometers, one or more gyroscopes, one or more magnetometers, another suitable type of sensor that detects motion, a type of sensor used for error correction of the IMU 2110, or some combination thereof. The position sensors 2112 may be located external to the IMU 2110, internal to the IMU 2110, or some combination thereof.

The locators 2108 are traced by an external imaging device of a virtual reality system, such that the virtual reality system can track the location and orientation of the entire HMD 2100. Information generated by the IMU 2110 and the position sensors 2112 may be compared with the position and orientation obtained by tracking the locators 2108, for improved tracking accuracy of position and orientation of the HMD 2100. Accurate position and orientation may help presenting appropriate virtual scenery to the user as the latter moves and turns in 3D space.

The HMD 2100 may further include a depth camera assembly (DCA) 2111, which captures data describing depth information of a local area surrounding some or all of the HMD 2100. To that end, the DCA 2111 may include a laser radar (LIDAR), or a similar device. The depth information may be compared with the information from the IMU 2110, for better accuracy of determination of position and orientation of the HMD 2100 in 3D space.

The HMD 2100 may further include an eye tracking system 2124 for determining orientation and position of user's eyes in real time. The obtained position and orientation of the eyes may allow the HMD 2100 to determine the gaze direction of the user and to adjust the image generated by the SMLs 2114 and/or to adjust the pupil steering optic accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 2102.

Figure 21B:
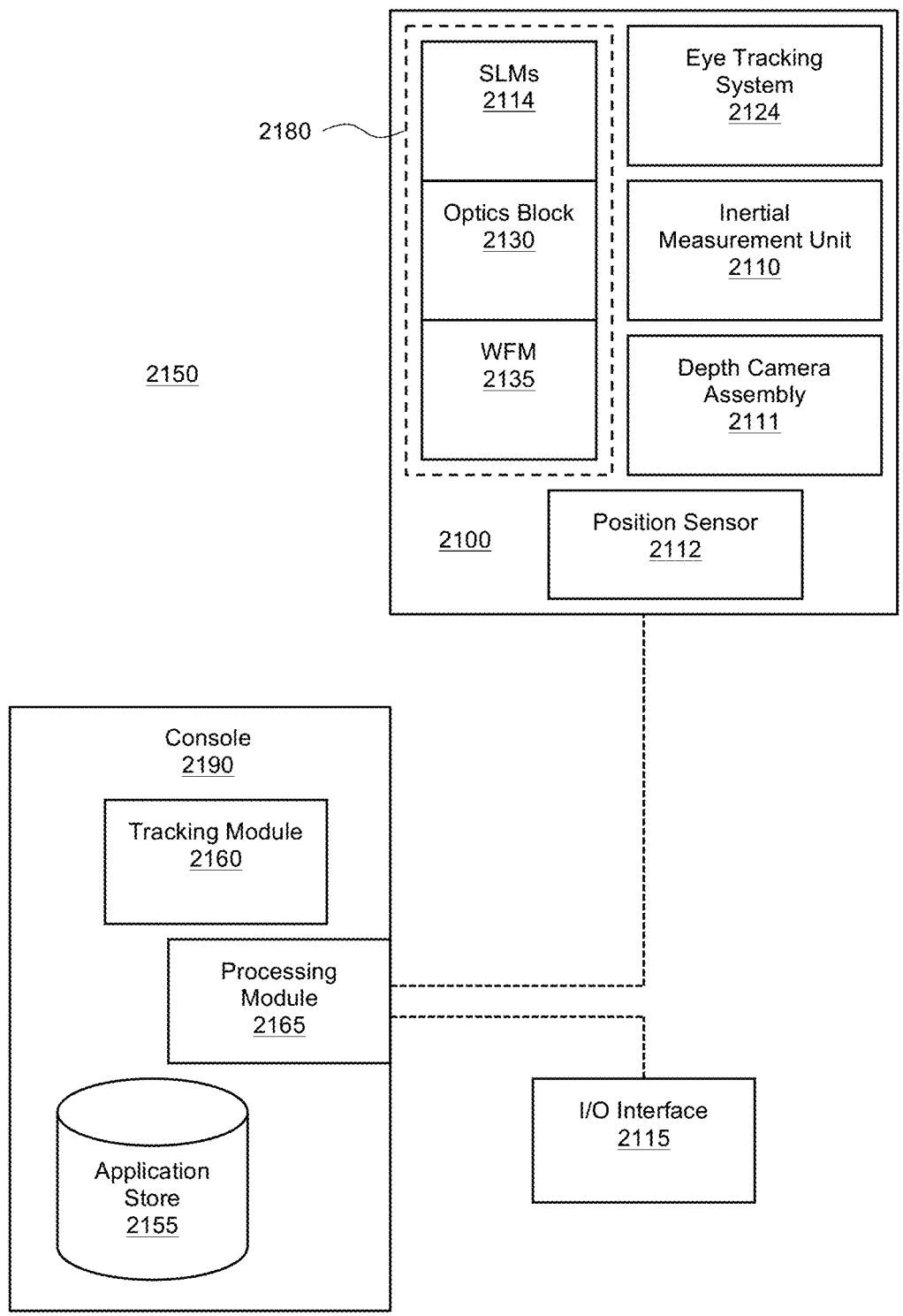
FIG. 21B is a block diagram of a virtual reality system including the headset of FIG. 21A.

Referring to FIG. 21B, a VR system 2150 may be an example implementation of the display systems described above with reference to FIGS. 1, 2, 4-12. The VR system 2150 includes the HMD 2100 of FIG. 21A, a console 2190 that may be storing various AR/VR applications, setup and calibration procedures, 3D videos, etc., and an input/output (I/O) interface 2115 for operating the console 2190 and/or interacting with the AR/VR environment. In some implementations, console 2190 may be at least partially disposed in the body of the HMD 2100. In some implementations, console 2190, or some parts thereof, may be external, and the HMD 2100 may be "tethered" to the console 2190 with a physical cable, or connected to the console 2190 via a wireless communication link such as Bluetooth®, Wi-Fi, etc. There may be multiple HMDs 2100, each having an associated I/O interface 2115, with each HMD 2100 and I/O interface(s) 2115 communicating with the console 2190. In alternative configurations, different and/or additional components may be included in the AR/VR system 2150. Additionally, functionality described in conjunction with one or more of the components shown in FIGS. 21A and 21B may be distributed among the components in a different manner than described in conjunction with FIGS. 21A and 21B in some embodiments. For example, some or all of the functionality of the console 2190 may be provided by the HMD 2100, and vice versa. The HMD 2100 may be provided with a processing module capable of achieving such functionality.

As described above with reference to FIG. 21A, the HMD 2100 may include the eye tracking system 2124 (FIG. 21B) for tracking eye position and/or eye orientation, determining gaze angle and convergence angle, etc., the IMU 2110 for determining position and orientation of the HMD 2100 in 3D space, the DCA 2111 for capturing the outside environment, the position sensor 2112 for independently determining the position of the HMD 2100, and the display system 2180 for displaying AR/VR content to the user. The display engine 2180 may include (FIG. 21B) one or image generators or SLMs 2114, and may further include an optic block 2130, whose function is to convey the images generated by the SLMs 2114 to the user's eye. The optic block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display engine 2180 may further include a pupil-steering wavefront modulator (WFM) 2135, which may include varifocal elements and may be a part of the optic block 2130. The function of the WFM 2135 may be to steer the exit pupil and/or to adjust the focus of the optic block 2130 e.g. to compensate for vergence-accommodation conflict, to correct for vision defects of a particular user, to offset aberrations of the optic block 2130, etc. The WFM module 2135 may be for example embodied with a switchable PBP stack such as those illustrated in FIGS. 18, 19, 20A, 20B, their variations and combinations, and may include a depolarizer in some embodiments.

The I/O interface 2115 is a device that allows a user to send action requests and receive responses from the console 2190. An action request is a request to perform a particular action. For example, an action request may be an instruction to start or end capture of image or video data or an instruction to perform a particular action within an application. The I/O interface 2115 may include one or more input devices, such as a keyboard, a mouse, a game controller, or any other suitable device for receiving action requests and communicating the action requests to the console 2190. An action request received by the I/O interface 2115 is communicated to the console 2190, which performs an action corresponding to the action request. In some embodiments, the I/O interface 2115 includes an IMU that captures calibration data indicating an estimated position of the I/O interface 2115 relative to an initial position of the I/O interface 2115. In some embodiments, the I/O interface 2115 may provide haptic feedback to the user in accordance with instructions received from the console 2190. For example, haptic feedback can be provided when an action request is received, or the console 2190 communicates instructions to the I/O interface 2115 causing the I/O interface 2115 to generate haptic feedback when the console 2190 performs an action.

The console 2190 may provide content to the HMD 2100 for processing in accordance with information received from one or more of: the IMU 2110, the DCA 2111, the eye tracking system 2124, and the I/O interface 2115. In the example shown in FIG. 21B, the console 2190 includes an application store 2155, a tracking module 2160, and a processing module 2165. Some embodiments of the console 2190 may have different modules or components than those described in conjunction with FIG. 21B. Similarly, the functions further described below may be distributed among components of the console 2190 in a different manner than described in conjunction with FIGS. 21A and 21B.

The application store 2155 may store one or more applications for execution by the console 2190. An application is a group of instructions that, when executed by a processor, generates content for presentation to the user. Content generated by an application may be in response to inputs received from the user via movement of the HMD 2100 or the I/O interface 2115. Examples of applications include: gaming applications, presentation and conferencing applications, video playback applications, or other suitable applications.

The tracking module 2160 may calibrate the AR/VR system 2150 using one or more calibration parameters and may adjust one or more calibration parameters to reduce error in determination of the position of the HMD 2100 or the I/O interface 2115. Calibration performed by the tracking module 2160 also accounts for information received from the IMU 2110 in the HMD 2100 and/or an IMU included in the I/O interface 2115, if any. Additionally, if tracking of the HMD 2100 is lost, the tracking module 2160 may re-calibrate some or all of the AR/VR system 2150.

The tracking module 2160 may track movements of the HMD 2100 or of the I/O interface 2115, the IMU 2110, or some combination thereof. For example, the tracking module 2160 may determine a position of a reference point of the HMD 2100 in a mapping of a local area based on information from the HMD 2100. The tracking module 2160 may also determine positions of the reference point of the HMD 2100 or a reference point of the I/O interface 2115 using data indicating a position of the HMD 2100 from the IMU 2110 or using data indicating a position of the I/O interface 2115 from an IMU included in the I/O interface 2115, respectively. Furthermore, in some embodiments, the tracking module 2160 may use portions of data indicating a position or the HMD 2100 from the IMU 2110 as well as representations of the local area from the DCA 2111 to predict a future location of the HMD 2100. The tracking module 2160 provides the estimated or predicted future position of the HMD 2100 or the I/O interface 2115 to the processing module 2165.

The processing module 2165 may generate a 3D mapping of the area surrounding some or all of the HMD 2100 ("local area") based on information received from the HMD 2100. In some embodiments, the processing module 2165 determines depth information for the 3D mapping of the local area based on information received from the DCA 2111 that is relevant for techniques used in computing depth. In various embodiments, the processing module 2165 may use the depth information to update a model of the local area and generate content based in part on the updated model.

The processing module 2165 executes applications within the AR/VR system 2150 and receives position information, acceleration information, velocity information, predicted future positions, or some combination thereof, of the HMD 2100 from the tracking module 2160. Based on the received information, the processing module 2165 determines content to provide to the HMD 2100 for presentation to the user. For example, if the received information indicates that the user has looked to the left, the processing module 2165 generates content for the HMD 2100 that mirrors the user's movement in a virtual environment or in an environment augmenting the local area with additional content. Additionally, the processing module 2165 performs an action within an application executing on the console 2190 in response to an action request received from the I/O interface 2115 and provides feedback to the user that the action was performed. The provided feedback may be visual or audible feedback via the HMD 2100 or haptic feedback via the I/O interface 2115.

In some embodiments, based on the eye tracking information (e.g., orientation of the user's eyes) received from the eye tracking system 2124, the processing module 2165 determines resolution of the content provided to the HMD 2100 for presentation to the user using the SLM 2125. The processing module 2165 may provide the content to the HMD 2100 having a maximum pixel resolution in a foveal region of the user's gaze. The processing module 2165 may provide a lower pixel resolution in other regions of the SLM 2125, thus lessening power consumption of the AR/VR system 2150 and saving computing resources of the console 2190 without compromising a visual experience of the user. In some embodiments, the processing module 2165 can further use the eye tracking information to adjust how objects are displayed with the SLM 2125 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry specific to a given function.

The present disclosure is not to be limited in scope by the specific embodiments described herein, and various other embodiments and modifications will become evident to the skilled reader from the present disclosure. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. For example, embodiments described herein with reference to wearable display systems such as HMDs may also be implemented in other display systems, such as but not exclusively heads-up displays (HUDs) and heads-down displays. Accordingly, the claims set forth below should be construed in view of the full breadth and spirit of the present disclosure as described herein.

What is claimed is:

1. A display device comprising:
   a first spatial light modulator (SLM) configured to impart first image information upon a first light beam to provide a first image beam;
   a second SLM configured to impart second image information upon a second light beam to provide a second image beam; and
   at least one pupil steering optic (PSO) operable to direct the first and second image beams toward at least one first exit pupil location responsive to one or more first control signals, and to direct the first and second image beams toward at least one second exit pupil location responsive to one or more second control signals.

2. The display device of claim 1 further comprising:
   an eye tracking module configured to provide eye position information; and
   a controller operatively coupled to the eye tracking module and configured to provide the one or more first control signals or the one or more second control signals to the at least one PSO in dependence on the eye position information.

3. The display device of claim 2 wherein the first and second image beams converge at the at least one first exit pupil location at differing angles of incidence.

4. The display device of claim 3 wherein at least one of the first SLM or the second SLM is configured to operate in reflection.

5. The display device of claim 3 wherein the at least one PSO comprises a first wavefront modulator (WFM) configured to operate in transmission.

6. The display device of claim 5 wherein the first WFM comprises at least one polarization-controllable device.

7. The display device of claim 6 wherein the at least one polarization-controllable device comprises a polarization switch and one of a polarization grating or a polarization-sensitive lens.

8. The display device of claim 5 wherein the first WFM is disposed in optical paths of the first and second image beams.

9. The display device of claim 8 wherein the first WFM is configured to focus the first and second image beams at different exit pupil locations.

10. The display device of claim 5 wherein the first WFM is disposed in an optical path of the first image beam, the at least one PSO comprising a second WFM disposed in an optical path of the second image beam.

11. The display device of claim 10 wherein the first WFM and the second WFM are configured to focus the first image beam and the second image beam to a same exit pupil location.

12. The display device of claim 11 wherein the first WFM and the second WFM are configured to focus the first image beam and the second image beam to the same exit pupil location in complementary solid angles to support an enhanced field of view that exceeds a field of view supported by either one of the first WFM or the second WFM.

13. The display device of claim 1 further comprising at least one optical source configured to provide the first and second light beams.

14. The display device of claim 1 comprising folded optic disposed in an optical path of at least one of the first and second image beams.

15. The display device of claim 5 comprising a folded optic disposed upstream of the first WFM.

16. The display device of claim 15 wherein the folded optic comprises at least one of a pancake lens or a birdbath optic.

17. A method for displaying an image to a user, the method comprising:
   obtaining eye position information for an eye of the user;
   encoding image information onto a plurality of spatial light modulators (SLM);
   illuminating the plurality of SLMs with at least partially coherent light beams to obtain a plurality of image beams;
   passing the plurality of image beams through a pupil steering optic configured to operate in a plurality of states supporting a plurality of exit pupil locations, wherein in at least one of the states at least two of the image beams are received at one or more exit pupil locations in distinct solid angles; and
   controlling the pupil steering optic to steer the plurality of image beams toward at least one of the exit pupil locations responsive to the eye position information.

18. A holographic projector comprising:
   first and second spatial light modulators configured to impart first and second image information upon first and second light beams, respectively, to obtain image light carrying an image in angular domain; and
   a pupil steering optic optically coupled to the first and second spatial light modulators for conveying the image light to an exit pupil of the holographic projector, wherein the first and second image information correspond to first and second portions, respectively, of the image in angular domain at the exit pupil thereof;
   wherein the pupil steering optic comprises a tunable element for adjusting a position of the exit pupil in 3D space.

19. The holographic projector of claim 18, wherein the pupil steering optic comprises first and second pupil steering assemblies for conveying the first and second portions, respectively, of the image in angular domain to the exit pupil.

* * * * *